(12) United States Patent
Meyers et al.

(10) Patent No.: US 7,862,258 B2
(45) Date of Patent: Jan. 4, 2011

(54) FLOATING STANDOFF ASSEMBLY

(75) Inventors: Frank Meyers, Redondo Beach, CA (US); John A. Brown, Lomita, CA (US)

(73) Assignee: Kepner Plastics Fabricators, Inc., Torrance, CA (US)

( * ) Notice: Subject to any disclaimer, the term of this patent is extended or adjusted under 35 U.S.C. 154(b) by 600 days.

(21) Appl. No.: 11/742,301

(22) Filed: Apr. 30, 2007

(65) Prior Publication Data

US 2008/0267717 A1 Oct. 30, 2008

(51) Int. Cl.
*E02B 3/26* (2006.01)

(52) U.S. Cl. .................. 405/215; 405/63; 114/219

(58) Field of Classification Search ............ 405/212, 405/215, 60, 63, 66; 114/219, 220
See application file for complete search history.

(56) References Cited

U.S. PATENT DOCUMENTS

| | | | |
|---|---|---|---|
| 3,693,572 A * | 9/1972 | Crook | 114/219 |
| 4,068,478 A | 1/1978 | Meyers | |
| 4,285,616 A * | 8/1981 | Evetts | 405/215 |
| 4,295,755 A | 10/1981 | Meyers | |
| 4,497,593 A * | 2/1985 | Kramer | 405/212 |
| 4,752,393 A | 6/1988 | Meyers | |
| 5,051,029 A | 9/1991 | Ecker | |
| 5,071,287 A | 12/1991 | Wallace | |
| 5,071,545 A | 12/1991 | Ashtary | |
| 5,372,455 A | 12/1994 | Tarca | |
| 5,441,006 A * | 8/1995 | Wood | 114/220 |
| 5,480,261 A | 1/1996 | Meyers | |
| 6,767,162 B2 | 7/2004 | Meyers | |

OTHER PUBLICATIONS

Oil Spill Equipment; Boom Stand Off Unit; Elastec Inc.; AmericanMarine Inc.; May 2004;Elastec/American Marine, Carmi, IL.
SeaCurtain D-Fender Oil Boom Stand-Off; Kepner Plastics Fabricators, Inc., Torrance, California.

* cited by examiner

*Primary Examiner*—John Kreck
(74) *Attorney, Agent, or Firm*—Fulwider Patton LLP

(57) ABSTRACT

A standoff system for keeping a containment boom or other floating barrier device spaced at a desired standoff distance away from a structure. The system includes an inner side member, an outer side member, and a plurality of compression members disposed between the side members. The system has a collapsed configuration in which the distance between the inner and outer side members is less than the desired standoff distance, and a deployed configuration in which the distance between the side members is greater than or substantially equal to the desired standoff distance. Alternatively, the system can be collapsed longitudinally by moving the adjacent compression members into abutting relationship with each other. The system is towed into place in the collapsed configuration, and once in place, is transformed into the deployed configuration by applying tension to the side members. The system also may include one or more tension members attached diagonally between adjacent compression members to keep the system in the deployed configuration. The standoff system can be a separate, free-standing structure placed between a ship and a boom or it can be integrated with a containment boom.

25 Claims, 16 Drawing Sheets

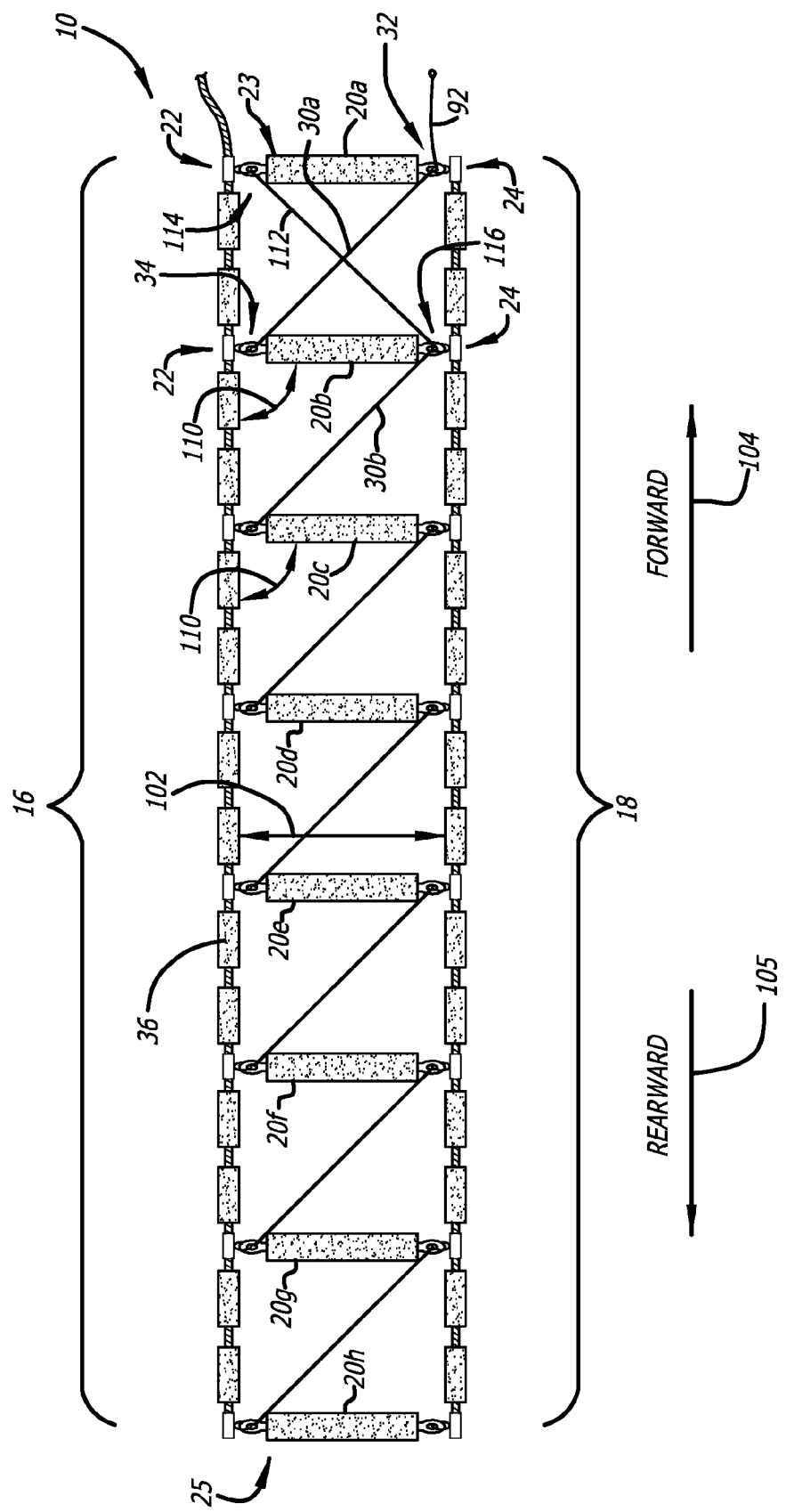

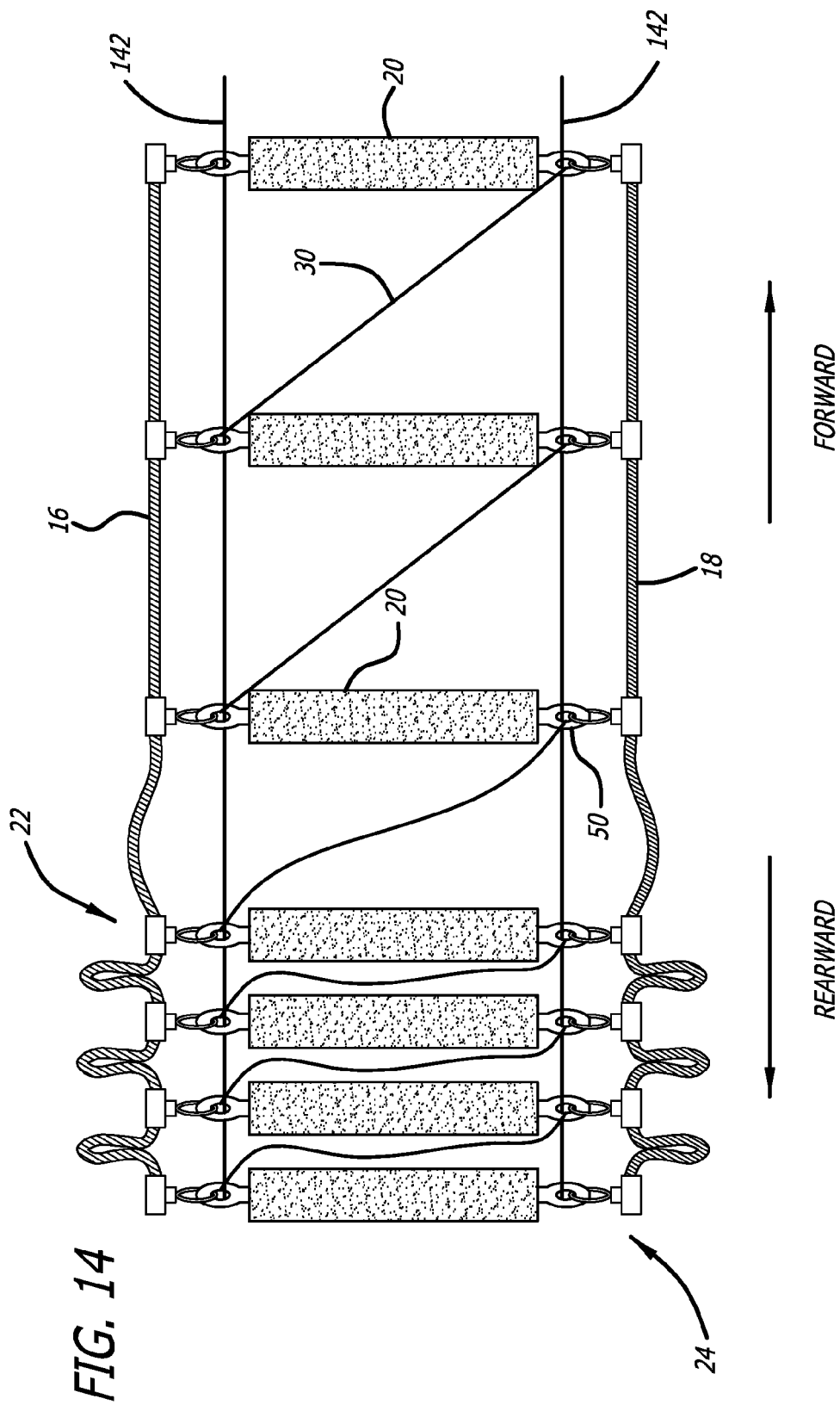

FLOATING STANDOFF ASSEMBLY

FIELD OF THE INVENTION

This invention relates generally to standoffs, and more particularly has reference to a floating standoff assembly for keeping a barrier or other floating device a distance apart from a ship, dock or other marine structure.

BACKGROUND OF THE INVENTION

Loading and unloading of shipping vessels at onshore terminals sometimes results in contamination spilling into the water surrounding the vessel. Examples of contamination include oil, fuel, and solid matter. Floating containment booms or barriers are often deployed around the vessel as a precaution. In the event of a spill, the contaminant is held within the area enclosed by the containment boom where it may be more easily cleaned up. When the containment boom is placed too close to the vessel, however, contaminant may spill into an area outside of the area enclosed by the containment boom. For this reason, it is desirable to deploy the containment boom at some distance, commonly referred to as a standoff, away from the vessel. The standoff distance is often mandated by government regulations.

The proper standoff distance is often difficult to maintain because containment booms are prone to inward movement toward the vessel hull due to high wind, tide, current conditions, or other forces pushing on the containment boom. To obviate this problem, a plurality of relatively small, individual standoff units are sometimes floated on the water between the vessel and the containment boom for the purpose of keeping the containment boom away from the vessel hull. Each of these standoff units is typically triangular in shape and is made of aluminum or plastic tubing with foam or foam fill for buoyancy. It also has been proposed to use D-shaped fenders made of flexible foam-filled tubing as individual standoff units. However, because shipping vessels are often quite large, many such standoff units must be individually handled and deployed around the ship, which increases the time required for set-up and take-down, and in turn adds to the cost of loading and unloading operations. The cost of anchoring these multiple individual standoff units in the water also can be quite significant. In addition, since there is generally no support in the areas between the standoffs, the boom can bend inwardly toward the vessel in those areas, producing undesirable gaps in protection. Moreover, storage of these multiple units can present still further problems.

Other methods which have been devised to maintain a standoff distance rely on complex deployment mechanisms, such as cranes and the like, that are fixed to the ship to place the boom into the water and hold the boom in position. Such deployment mechanisms are often expensive to install, repair and maintain, and their use is generally limited to one ship. Also, special boom designs must often be employed with such deployment mechanisms. In addition, some booms have been provided with fender elements or support arms that inflate to keep the boom away from the vessel hull. However, inflatable fenders may not have sufficient rigidity to resist compression forces and they can complicate boom design.

What is needed is standoff system which may be deployed quickly and easily. There is also a need for a standoff system that is readily collapsible to facilitate transport, recovery, storage, set-up, and take-down. What also is needed is a standoff system that is compatible for use with containment booms that have no built-in or integrated means for maintaining the desired standoff distance from the vessel, and which minimizes bending of the boom between the points of support. There is a further need for a standoff system that is inexpensive to manufacture and repair. The present invention satisfies these and other needs.

SUMMARY OF THE INVENTION

Briefly and in general terms, the present invention is directed to a standoff system for providing a desired minimum standoff distance between a floating device, such as a containment boom, and an adjacent structure, such as a dock or ship. The system generally includes an inner side member, an outer side member (which can be separate from or integrated into the floating device), and a plurality of compression members disposed between the side members, each compression member having an inward end attached to the inner side member and an outward end attached to the outer side member, the inward ends being spaced a first distance apart from each other and the outward ends being spaced a second distance apart from each other. In one embodiment, the compression members have a first, collapsed orientation in which the compression members are disposed at first angles relative to the side members such that the distance between the side members is less than the desired standoff distance. The compression members further have a second, deployed orientation in which the compression members are disposed at second angles relative to the side members, the second angles being greater than the first angles such that the distance between the inner side member and the outer side member is substantially equal to or greater than the desired standoff distance.

In another aspect of the invention, the outer side member is moveable longitudinally relative to the inner side member, such that when the outer side member is moved in a forward direction, the outward ends of the compression members are moved in the forward direction and the compression members are moved from the collapsed orientation to the deployed orientation. It will be appreciated that the terms "inner" and "outer" and the terms "forward" and "rearward" are being used interchangeably and in a relative sense throughout the specification.

Another aspect of the invention relates to a limiting member that restrains the compression members from moving beyond the deployed orientation upon the application of a longitudinal force to the outer side member. The limiting member is connected to at least one compression member (but not necessarily all the compression members) and is configured to restrain forward movement of the outward end of the compression member when the outer side member is moved in a forward direction.

In one embodiment of the invention, the first distance between the inward ends of the compression members is substantially equal to the second distance between the outward ends of the compression members and the side members are substantially straight when the compression members are in the deployed orientation. In an alternative embodiment, the first distance between the inward ends of the compression members differs from the second distance between the outward ends of the compression members and the side members are curved when the compression members are in the deployed orientation.

Another aspect of the invention relates to a locking member that restrains the compression members from moving out of the deployed orientation. The locking member is connected to at least one compression member and is configured to restrain rearward movement of the outward end of the compression member when the outer side member is moved in a rearward direction.

In one aspect of the invention, the inner side member and the outer side member may be formed of material selected from the group of flexible tension members consisting of rope, webbing, cable or fabric. In another aspect of the invention, the inner and outer side members are provided with a series of flotation sleeves disposed between the ends of the compression members.

In still another aspect of the invention, at least one compression member has sufficient buoyancy to keep the compression member afloat on water. Selectively, the at least one compression member may include a rigid core surrounded by a sleeve of buoyant material. Alternatively, the at least one compression member may include a tube with sealed ends.

In a further aspect of the invention, the inward and outward ends of the compression members are flexibly connected to the inner and outer side members, respectively. In one embodiment, the compression members are flexibly connected to the side members by flotation buoys, each flotation buoy having a connector disposed on a portion of the buoy for engaging the adjacent compression member and side member.

In yet another aspect of the invention, the inner and outer side members include multiple segments detachably connected in an end-to-end configuration.

In still another aspect of the invention, an elastic link is connected to the limiting member and to the at least one of the side members for taking up slack in the limiting member when the compression members are in the collapsed orientation.

In yet another aspect of the invention, the inner side member is flexible and is configured to be placed in tension, the inward ends of the compression members being spaced a first distance apart from each other when the inner side member is placed in tension, the outer side member is flexible and is configured to be placed in tension, and the outward ends of the compression members being spaced a second distance apart from each other when the outer side member is placed in tension, the second distance being substantially equal to the first distance whereby the compression members are substantially parallel to each other when the inner side member and the outer side member are placed in tension.

In a further aspect of the invention, the inner side member is flexible and is configured to be placed in tension, the inward ends of the compression members being spaced a first distance apart from each other when the inner side member is placed in tension, the outer side member is flexible and is configured to be placed in tension, and the outward ends of the compression members being spaced a second distance apart from each other when the outer side member is placed in tension, the second distance being unequal to the first distance whereby the compression members are at angles to each other when the inner side member and the outer side member are placed in tension.

In still another aspect of the invention, the compression members are selectively movable into a straight configuration in which the compression members are substantially parallel and spaced apart from each other, and into a cornering configuration in which at least two of the compression members are arranged at a selected angle to each other, and a connection device is configured to connect the inward ends of the at least two compression members together such that the at least two compression members are restrained from moving out of the cornering configuration.

In a further aspect, the present invention is directed to a standoff system for providing a desired minimum standoff distance between a structure and a floating device, in which the system includes an inner side member having a rear end and a forward end, an outer side member having a rear end and a forward end, and a plurality of compression members disposed between the inner side member and the outer side member, the compression members being spaced apart along the inner side member and the outer side member, each compression member having an inward end and an outward end, the inward ends of the plurality of compression members being attached to the inner side member and the outward ends of the plurality of compression members being attached to the outer side member such that the outward ends of the compression members are movable relative to the inner side member. In addition, at least one tension member is provided having a front connection and a rear connection spaced a first selected distance apart from the front connection, the front connection being attached to the outward end of a forward compression member, the rear connection being attached to the inward end of a rearward compression member, the forward compression member being disposed closer to the forward end of the inner side member than the rearward compression member, and wherein the first selected distance between the front connection and the rear connection of the tension member is selected to restrain forward movement of the outward end of the forward compression member when the distance between the inner side member and the outer side member is substantially equal to or greater than the desired standoff distance.

In still another aspect of the invention, a second tension member is provided, the second tension member having a first connection and a second connection spaced a second selected distance apart from the first connection, the first connection being attached to the inward end of a forward compression member and the second connection being attached to the outward end of a rearward compression member. The second selected distance between the first connection and second connection of the second tension member is selected to restrain rearward movement of the outer end of the forward compression member when the distance between the inner side member and the outer side member is substantially equal to or greater than the desired standoff distance.

In a further aspect, the present invention is directed to a containment boom for deployment around a structure, in which the boom includes an elongate inner side member, an elongate flotation portion disposed at a distance from the inner side member, the flotation portion supporting a skirt portion depending downwardly from the flotation portion, a plurality of compression members, each compression member having an inward end attached to the inner side member and an outward end attached to the flotation portion, the inward ends being spaced apart from each other along the inner side member, the outward ends being spaced apart from each other along the flotation portion, and wherein the plurality of compression members is movable from a first, collapsed orientation in which the compression members are arranged at first angles relative to the inner side member when the inner side member is placed in tension such that the distance between inner side member and the flotation portion is less than a desired minimum standoff distance, to a second, deployed orientation in which the compression members are arranged at second angles relative to the inner side member when the inner side member is placed in tension, the second angles being greater than the first angles such that that the distance between inner side member and the flotation portion is greater than or substantially equal to the desired standoff distance.

In still a further aspect, the present invention is directed to a standoff system for providing a desired minimum standoff distance between a floating device and an adjacent structure, in which the system includes a flexible inner side member, a flexible outer side member, a plurality of substantially parallel compression members disposed between the side members, each compression member having an inward end attached to the inner side member and an outward end attached to the outer side member, the inward ends being spaced a first distance apart from each other along the inner side member and the outward ends being spaced a second distance apart from each other along the outer side member, the compression members having a first, collapsed configuration in which the compression members are disposed in a side-by-side abutting relation, and the compression members having a second, deployed configuration in which inward ends of the compression members are spaced apart from each other by a distance substantially equal to the first distance and the outward ends of the compression members are spaced apart from each other by a distance substantially equal to the second distance. In at least one embodiment, a pull line is attached to at least one of the compression members for moving the compression member from the deployed configuration to the collapsed configuration upon the application of a pulling force to the pull line.

While the invention has been described with reference to a containment boom, it will be appreciated that the invention is not limited to containment booms. Rather, the standoff can be used with any form of floating device to provide a standoff distance between the device and an adjacent ship, dock or other marine structure. For example, the standoff system can be used to provide a standoff distance between a ship and a marine security barrier disposed around a military ship to protect the ship from attack or unwanted intruders when the ship is moored at a dock or in a harbor.

Other features and advantages of the invention will become apparent from the following detailed description, taken in conjunction with the accompanying drawings, which illustrate, by way of example, the features of the invention.

BRIEF DESCRIPTION OF THE DRAWINGS

FIG. 1A is an enlarged fragmentary perspective view of one of the compression members of the standoff system shown in FIG. 1.

FIG. 9 is a plan view of the standoff system of FIG. 8 showing the system in a deployed configuration.

FIG. 14 is a plan view of an alternative standoff system embodying features of the present invention, shown in a partially collapsed configuration.

DETAILED DESCRIPTION OF THE PREFERRED EMBODIMENTS

Figure 1:
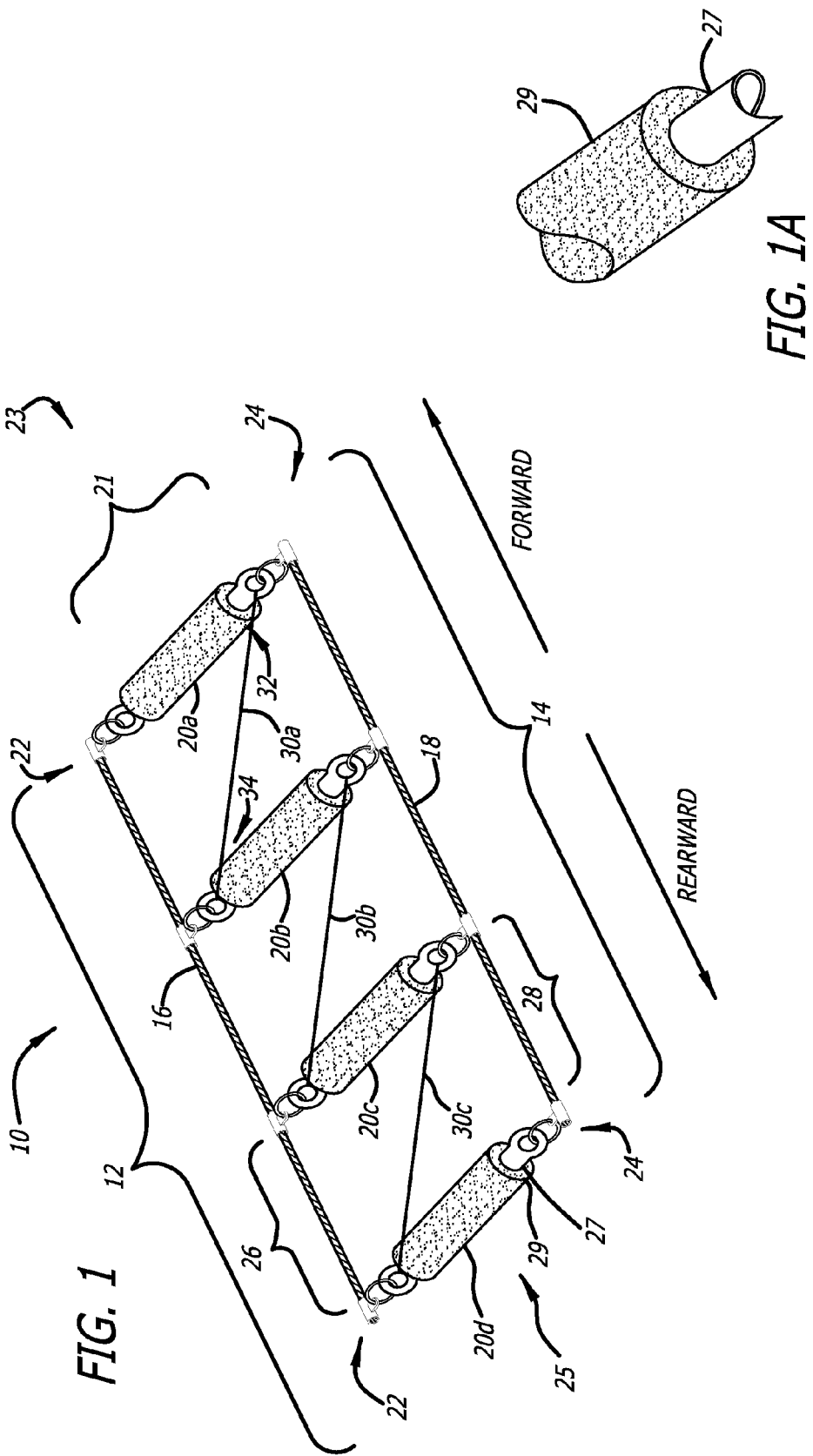
FIG. 1 is a perspective view of a standoff system embodying the novel features of the present invention, shown in a deployed configuration.
Figure 4:
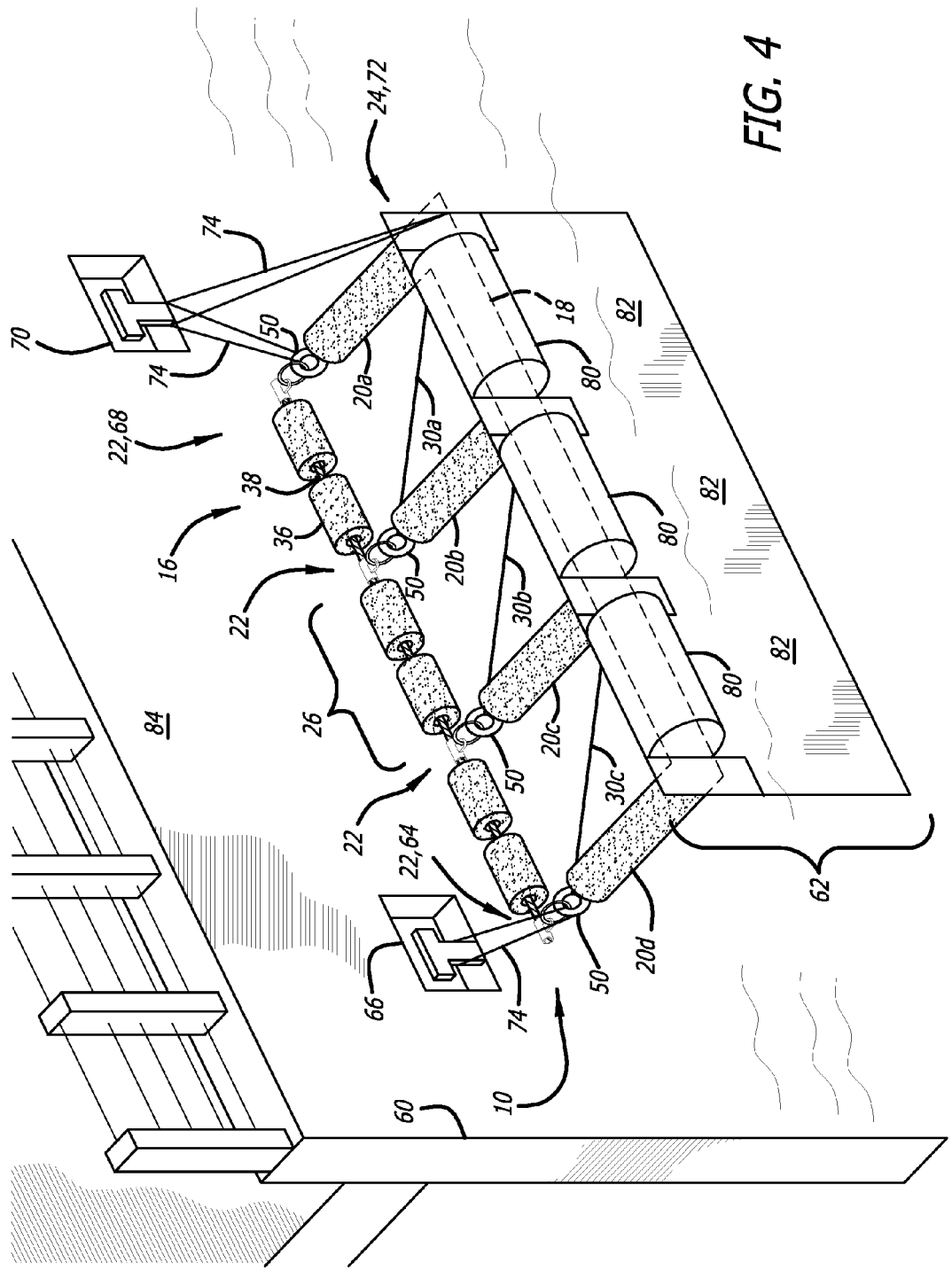
FIG. 4 is a perspective view of the standoff system of FIG. 2 deployed and floating on water between the side of a ship and a containment boom.

Referring now to the drawings, and particularly to FIG. 1, the invention is embodied in a standoff system 10 which is especially adapted for use in providing a desired minimum standoff distance between a containment boom or other form of defensive flotation barrier and an adjacent structure, such as a ship or dock. The standoff system 10 is generally designed to float on the surface of a body of water. When deployed, the standoff system 10 is typically located between the structure of interest and the containment boom or other floating device so that an inner side 12 of the standoff abuts the structure and an outer side 14 of the standoff abuts the containment boom or floating device. An example is shown in FIG. 4. When deployed, the standoff system 10 provides sufficient lateral rigidity to keep the containment boom 62 or other floating device from moving inward toward the structure 84 due to forces produced by wind, tidal changes, water current, and other conditions.

The standoff system 10 can be used with a variety of different kinds of floating devices or barrier systems. However, for ease of illustration, the exemplary embodiments disclosed herein will be described with reference to a containment boom of the type used to prevent the spread of contaminants across a body of water.

Referring again to FIG. 1, it can be seen that the standoff system 10 generally includes an inner side member 16 and an outer side member 18. Preferably, both side members 16, 18 are sufficiently flexible in regions to enable the standoff system 10 to be collapsed, flaked, folded onto itself, or rolled up for storage when not in use, and to be easily pulled out of storage for use. The inner and outer side members 16, 18 can be any desired length, and are designed to be placed in tension during deployment, as shown in FIG. 1. The side members 16, 18 can be made of rope, cable, webbing or fabric, and may be formed of plastic, synthetic fibers, naturally occurring fibers, metal, or other material. Suitable examples include, without limitation, polyethylene or polypropylene rope.

It is usually desirable for the side members 16, 18 to have some flotation ability. In the case of side members made of rope, for example, the natural buoyancy of the rope material may be sufficient. On the other hand, when the side members 16, 18 are made of cable or other non-buoyant material, additional flotation may be provided by the buoyancy of other components in the system, or by adding a foam sleeve or other flotation device to the side members as will be later described.

The standoff system 10 also includes a plurality of stiffeners or compression members 20 extending between the side members 16, 18. The compression members are designed to resist axial compression. In FIG. 1, four compression members 20a, 20b, 20c, 20d are shown, although the standoff system 10 may include any desired number of compression members. In the illustrated example, the first compression member 20a is disposed at the front 23 of the standoff system 10, the second compression member 20b is rearward of the first compression member, the third compression member 20c is rearward of the second compression member, and the fourth compression member 20d is disposed at the rear 25 of the standoff system 10. In most cases, the standoff system will be much longer than the one shown in FIG. 1 and have many more compression members 20. However, the example shown in FIG. 1 has been limited in size for ease of illustration.

Each compression member 20 has an inward end 22 attached to the inner side member 16 and an outward end 24 attached to the outer side member 18. Preferably, the compression members 20 have an end-to-end length 21 which is greater than or equal to the desired minimum standoff distance. The inward ends 22 are spaced a first distance 26 apart from each other along the inner side member 16, and the outward ends 24 are spaced a second distance 28 apart from each other along the outer side member 18. In the embodiment shown in FIG. 1, the first and second distances 26, 28 are substantially equal to each other and the side members 16, 18 are of substantially the same length, allowing the unit to follow a substantially straight path when the standoff system 10 is deployed. As will be discussed below, however, the first and second distances may differ from each other when a curved deployment configuration is desired.

In the illustrated example, each compression member 20 includes a rigid member 27 and a flotation member 29. The rigid member 27 is configured to have sufficient column strength to resist buckling or collapse when being squeezed between the structure of interest and the containment boom. In the embodiment shown in FIG. 1, the rigid member 27 is in the form of a rigid core of rod or pipe formed of metal, plastic or other material, and the flotation device 29 is in the form of a tube or sleeve (or a spaced array of one or more sleeves) of closed cell foam, or other buoyant material, surrounding the pipe. This construction is shown in greater detail in FIG. 1A. In an alternative embodiment, flotation can be provided in the compression members 20 without the use of a separate flotation member by forming the rigid member 27 of tube or pipe and sealing the ends of the tube or pipe with air inside to provide buoyancy. Various kinds of metal or plastic pipes, such as aluminum, steel or vinyl tubes or pipes are suitable for this purpose. It also will be appreciated that the compression members 20 may be formed without any flotation capability, if sufficient buoyancy is provided elsewhere in the standoff system 10 to keep the compression members 20 afloat.

If desired, the rigid members 27 may be configured to be telescoping with a detent lock to hold the member at various extended lengths. In this way, the length of the compression member can be selectively adjusted, as needed, to vary the standoff distance.

In the illustrated embodiment, the standoff system 10 also includes at least one tension member 30 extending diagonally between the outer end of one compression member and the inner end of another compression member. In FIG. 1, three tension members 30a, 30b, 30c are shown, although the standoff system 10 may include any desired number of tension members, including as few as one tension member for the entire system 10. For example, it is not necessary to provide tension members 30 between each pair of compression members 20, as shown in FIG. 1. Instead, in some embodiments, it may be desirable to provide a tension member 30 between only one pair of compression members 20 or between every other pair of compression members 20. Other arrangements also are possible. In each case, the tension members are generally flexible or collapsible links such as rope, cable or the like. In the illustrated embodiment, the first tension member 30a is located closest to the front 23 of the standoff system 10, while the third tension member 30c is located closest to the rear 25 of the standoff system.

Each tension member 30 has a front connection 32 and a rear connection 34 spaced apart from the front connection. The front connection 32 of the first tension member 30a is attached to the outward end 24 of the first compression member 20a. The rear connection 34 of the first tension member 30a is attached to the inward end 22 of the second compression member 20b. The front and rear connections 32, 34 may be configured to allow for selective removal and attachment of the tension members 30. As will be discussed in greater detail below, each tension member 30a, 30b, 30c functions as a limiting device to restrain forward movement of the compression members when the standoff system 10 is being deployed.

Figure 2:
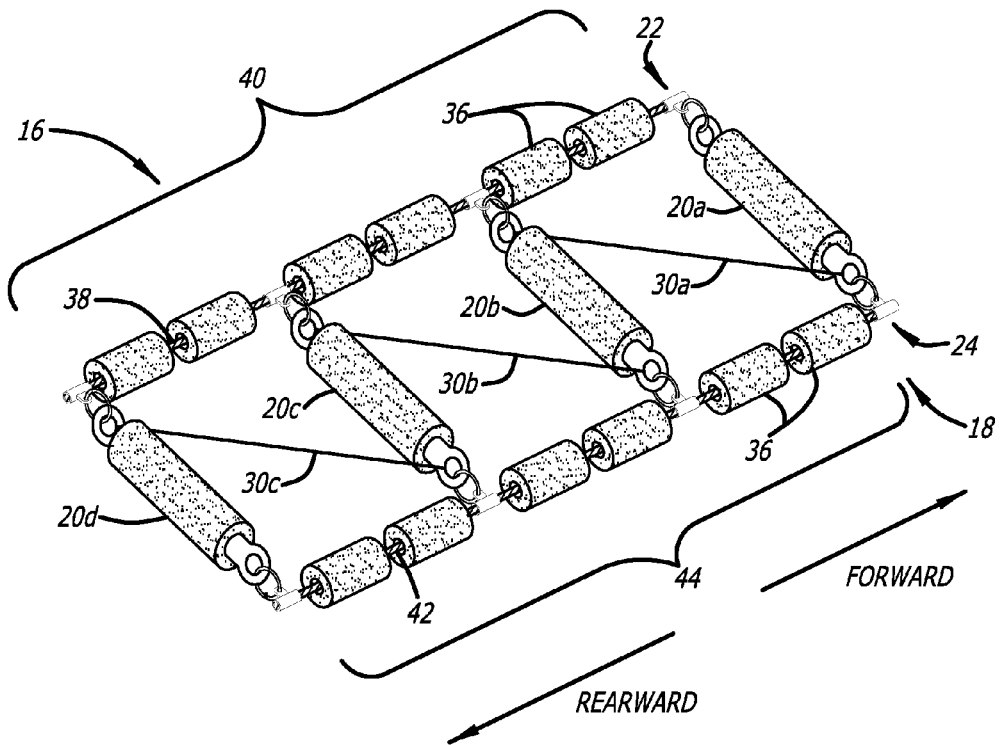
FIG. 2 is a perspective view of an alternative standoff system embodying the features of the present invention, shown in a deployed configuration with flotation sleeves disposed on the side members.
Figure 2A:
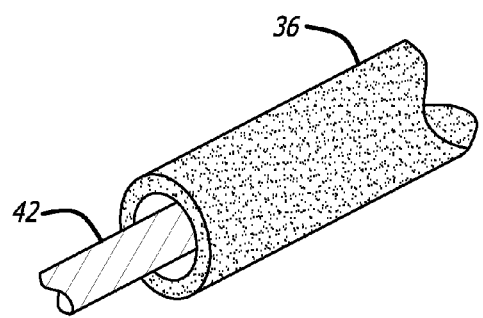
FIG. 2A is an enlarged fragmentary perspective view of one of the side members of the standoff system shown in FIG. 2.

FIG. 2 shows an alternative embodiment of the standoff system 10, in which a series of flotation sleeves 36 is arranged end-to-end along each of the side members 16, 18. In the embodiment shown, the inner side member 16 includes a rope 38 extending the entire length of the inner side member 16 and passing sequentially through a series 40 of elongate flotation sleeves 36. Similarly, the outer side member 18 includes a rope 42 extending the entire length of the outer side member 18 and passing sequentially through a series 44 of elongate sleeves 36. A detailed view of this arrangement is shown in FIG. 2A. In the example shown in FIG. 2, there are two sleeves 36 disposed between each adjacent pair of compression members 20, although a different number of sleeves 36 may be employed, if desired.

The sleeves 36 may be formed of closed cell foam with buoyancy to help keep the side members afloat. In addition to providing buoyancy, the sleeves 36 also may act as spacers to help maintain the desired spacing between the ends of adjacent compression members 20. While the compression members 20 are shown in FIG. 2 as having flotation sleeves of the type shown in FIG. 1, it will be appreciated that the flotation sleeves can be eliminated from the compression members 20, if desired.

The compression members 20 may be attached to the side members 16, 18 in a variety of different ways. In most cases, it is desirable to provide a flexible connection that allows for relative lateral movement between the compression members and side members.

Figure 3:
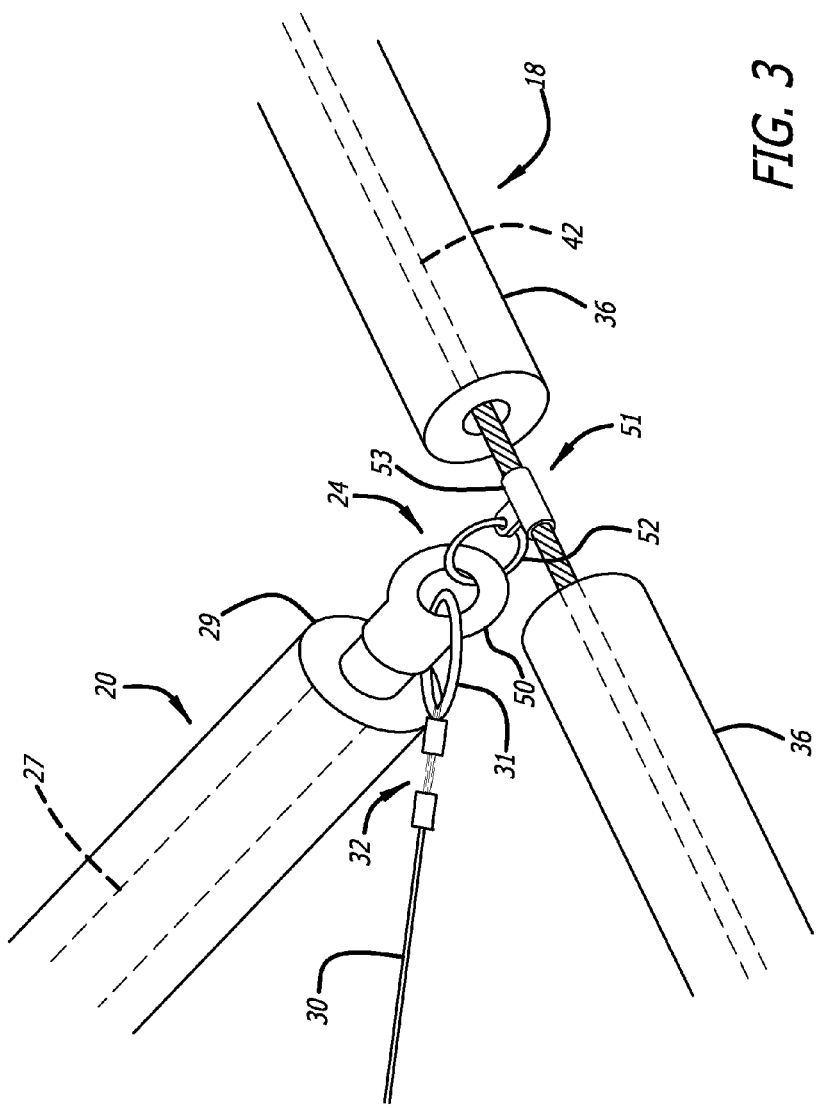
FIG. 3 is an enlarged fragmentary perspective view of the connection between the compression members, side members, and tension members in the standoff system of FIG. 2.

One particular example is shown in FIG. 3. In this example, each compression member 20 includes a ring 50 attached to the rigid rod 27 at both ends of the compression member 20. For ease of illustration, only one end 24 is shown in FIG. 3. The adjacent side member 18 is attached to the ring 50 by a connector 51 which tightly surrounds the rope 42 near the ring 50, and engages the ring 50 with a ring or loop 52 or other form of permanent or detachable connection to hold the rope 42 in a generally fixed location relative to the ring 50. In the embodiment shown in FIG. 3, the rope-engaging portion of the connection 51 is in the form of a cylindrical sleeve 53 tightly crimped onto the rope 42. The ring-engaging portion of the connector 51 is in the form of a metal ring 52 attached to the sleeve. Alternatively, a snap hook, clip, clasp or other form of permanent or detachable connector mechanism can be used to attach the connector 51 to the ring 50.

It will be appreciated that the connection shown in FIG. 3 allows the compression member to hinge or articulate three-dimensionally relative to the side members. Instead of using the connector 51, the rings 50 may be fixed to the side members 16, 18 in other ways. For example, the rope 42 may extend through the opening in the ring 50 and be secured thereto by knotting the rope 42 around the ring 50. Alternatively, the ring 50 may be crimped down onto the portion of the rope 42 which passes through the opening tightly enough to prevent the ring from moving along the rope.

In the illustrated example, the tension members 30 are attached to the rings 50 with loops 31 formed on the ends of the tension members. It will be appreciated that other types of connection devices also may be employed in addition to or as an alternative to the loops 31. Examples of suitable connection devices include, without limitation, clips, clasps, clamps, snap hooks, and similar devices. If desired, the tension members 30 can be provided with detachable connection devices so that the tension members can be detachably removed from the rings 50 or left in place during use. If desired, the tension members 30 may be attached to the rings 52 on the connectors 51 instead of being attached to the rings 50 on the compression members 20.

In some applications, it may be desirable to form the side members 16, 18 from multiple segments or pieces of rope or cable detachably connected to each other in an end-to-end fashion. Rings, clasps or snap hooks may be provided on the ends of these pieces of rope or cable to detachably engage the rings 50 on the ends of the compression members 20. In this way, it is possible to selectively connect or disconnect adjacent standoff sections or modules from each other in an end-to-end fashion, to vary the overall length of the standoff system 10.

Figure 3A:
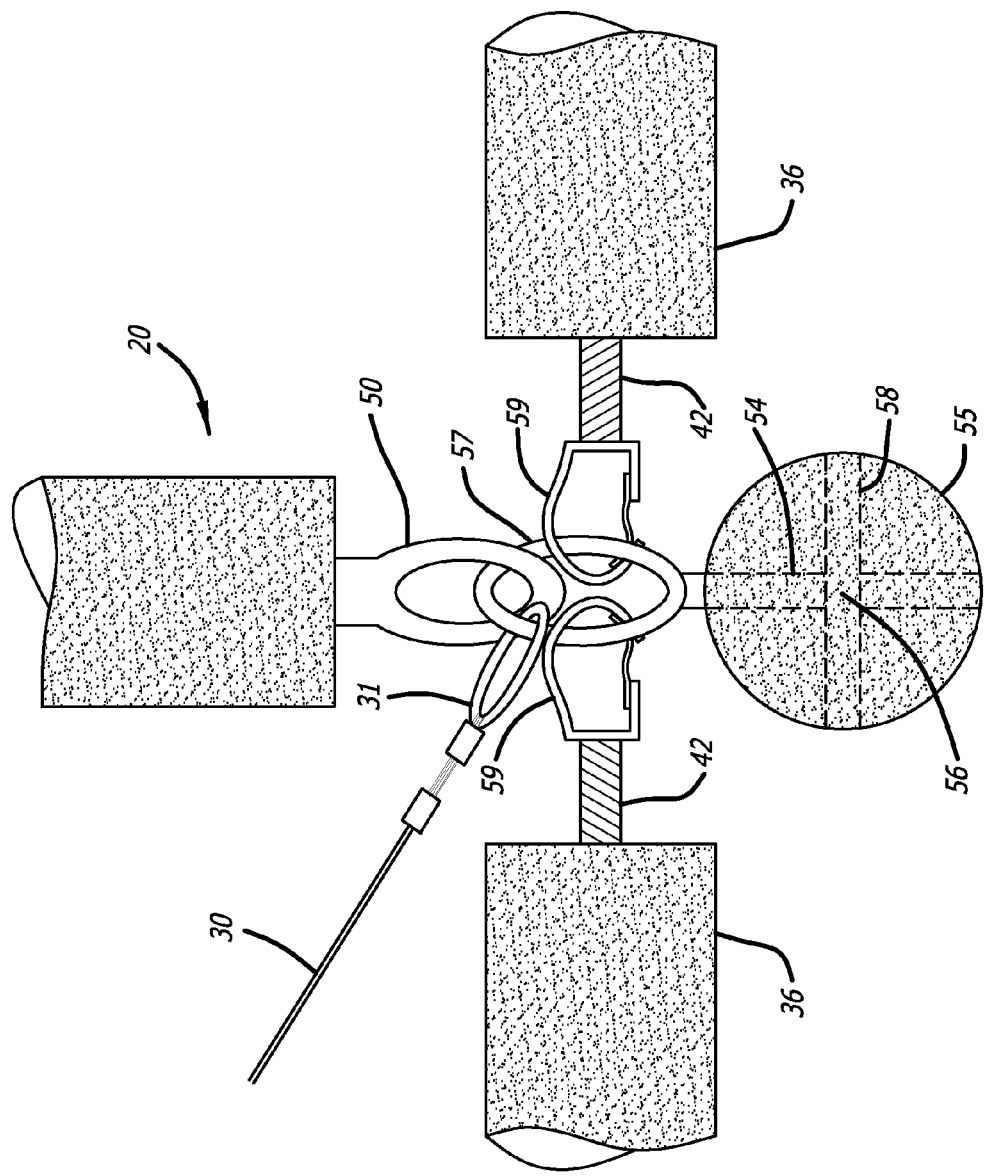
FIG. 3A is an enlarged plan view of an alternative connection between the compression members, side members and tension members.

FIG. 3A shows an alternative form of connection between the side members and the compression members. Once again, only one connection is shown for ease of illustration. In this particular embodiment, a ring 57 is connected to the end of a bar or rod 54 disposed within a flotation buoy 55 formed of foam or other buoyant material. The rod 54 is preferably held in place inside the buoy 55 by crossmember 58 screwed or welded to the rod 54 at a joint 56 inside the buoy. As illustrated, one end of the rod 54 extends beyond the buoy 55 and terminates in the ring 57. The adjacent compression member, side member and tension member are severally attached to the ring 57 in any detachable or permanent manner. In the illustrated embodiment, the end of the compression member 20 is provided with a ring 50 of the type previously described which engages the opening in the ring 57 on the buoy 55. The side member is a multi-piece side member of the type described above. Each of the pieces of rope or cable 42 in the multi-piece side member terminates in a snap hook 59 or other suitable connector device that engages the ring 57 on the buoy 55. The tension member 30 can be connected to buoy ring 57 as shown, or it can be alternatively connected to the compression member ring 50, as desired. The connection buoy is especially useful for connecting modular standoff sections.

It will be appreciated that the buoy-type connector described above provides flotation at the intersection points between the side members and the compression members, so that no additional flotation is required in either the side members or compression members. However, if desired, additional flotation can be provided in one or more of the side members, in one or more of the compression members, or in any combination thereof.

FIG. 4 shows the standoff system 10 of FIG. 2 deployed in water between the side 60 of a ship 84 and a floating containment boom or barrier 62. As shown, the inner and outer side members 16, 18 of the standoff system 10 are configured to abut the side 60 of the ship 84 and the boom 62, respectively, in order to provide the desired standoff distance. In some applications, it may be desirable to provide a protective layer in the form of a sheet or float (not shown) between the ship 84 and the standoff 10 to protect the ship from abrasion or other forms of damage. This protective layer may be connected to the ship 84 or to the standoff 10, as desired, in any conventional manner.

The inner side member 16 has a rear end 64 configured to be secured to a fixed position relative to the ship or other structure and a forward end 68 configured to be secured to a remote fixed location. In the embodiment shown in FIG. 4, the rear end 64 is attached to a tow point 66 on the side 60 of the ship 84 and the forward end 68 is attached to a remote tow point 70 on the ship. Preferably, the tow points 66, 70 are spaced apart by a sufficient distance to keep the side member 16 in tension. Alternatively, the rear end 64 or forward end 68 (or both) may be attached to fixed points on a dock, buoy, anchor or other structure in the water or on land adjacent the water.

Still referring to FIG. 4, it will be seen that the outer side member 18 also includes a forward end 72. The forward end 72 is pulled in the forward direction in order to place the outer side member in tension. Once the outer side member 18 is placed in tension, the forward end of the outer side member may be connected to the second tow point 70 or other fixed point to keep the outer side member 18 in tension.

The ends 64, 68, 72 of the side members 16, 18 may be attached to their respective anchor points 66, 70 by any suitable means, such as ropes 74 looped through the rings 50 on the forward-most and rearward-most compression members 20. Instead of or in addition to ropes 74, cables, clips, clasps, clamps, snap hooks, and similar devices may be used to secure the ends 64, 68, 72 to the fixed anchor points.

With continued reference to FIG. 4, it will be appreciated that the standoff system 10 may be configured as a stand alone device to be used with a conventional containment boom 62. In the illustrated example, the containment boom 62 includes a flotation portion 80 and a skirt portion 82 attached to the flotation portion. The flotation portion 80 is configured to float on the water surface and to extend a distance above the water surface to prevent contaminants on or near the water surface from spilling over the containment boom 62. The skirt portion 82 is configured to hang down from the flotation portion 80 below the surface of the water to prevent contaminants on or near the water surface from escaping beneath the flotation portion 80. In the illustrated example, the flotation portion 80 abuts the outer side member 18 of the standoff system 10.

It will be appreciated, however, that the standoff system can be formed as an integral part of a boom, if desired. In this case, the outer side member 18 of the standoff system 10 may be configured as a containment boom 62. For example, the flotation sleeves 36 shown in FIG. 2, may be replaced with flotation portions 80 and skirts 82. Alternatively, the outer side member 18 can be replaced in its entirety by a conventional boom structure with an integrated tension member. The outward ends 24 of the compression members 20 then can be permanently or temporarily attached to the boom in any suitable manner. For example, where the flotation portion of the boom is a continuous cylindrical shape, the outward ends 24 of the compression members 20 can be connected to the skirt below the water line or they can be connected to attachment points on the flotation portion itself.

Figure 5:
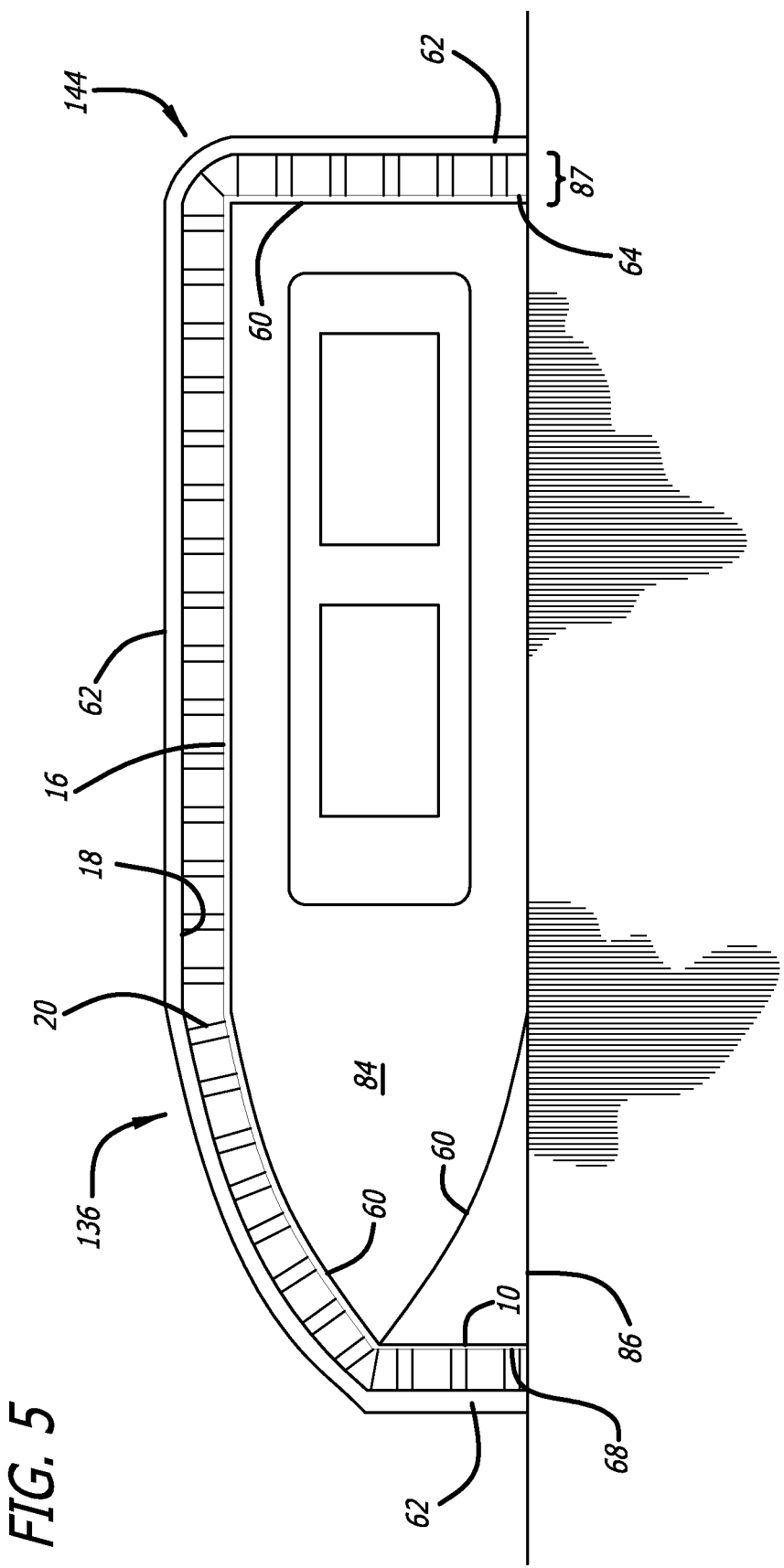
FIG. 5 is a schematic plan view of a standoff system embodying the features of the present invention, showing the standoff system deployed around a ship at a dock.

Referring next to FIG. 5, the standoff system 10 is shown deployed around three sides of a ship 84 situated adjacent a dock area 86. A single long standoff system 10 may be used for the entire ship 84 or a series of shorter standoff systems 10 may be used along different portions of the ship 84. When a single long system 10 is used, the ends 64, 68 of the standoff typically will be attached to anchors or to fixed locations on the dock to keep the system in tension. When shorter standoffs are used, the ends 64, 68 may be connected to the dock, to fixed structures on the ship 84 of the type shown in FIG. 4, or other fixed locations such as anchors or buoys. After the standoff system 10 is deployed around the ship 84, as is shown in FIG. 5, a containment boom 62 may then be deployed outside the standoff. The standoff 10 will function to provide a desired minimum standoff distance 87 between the containment boom 62 and the ship's hull. The standoff system 10 also can be used to completely surround a ship in open water, if desired.

The standoff system 10 shown in FIG. 2 has both a deployed configuration and a collapsed configuration. The deployed configuration as shown in FIG. 2, is used when the standoff system is in place around a ship or other boom-protected structure. The collapsed configuration, on the other hand, is used when the standoff system is being towed into place across the water surface.

Figure 6:
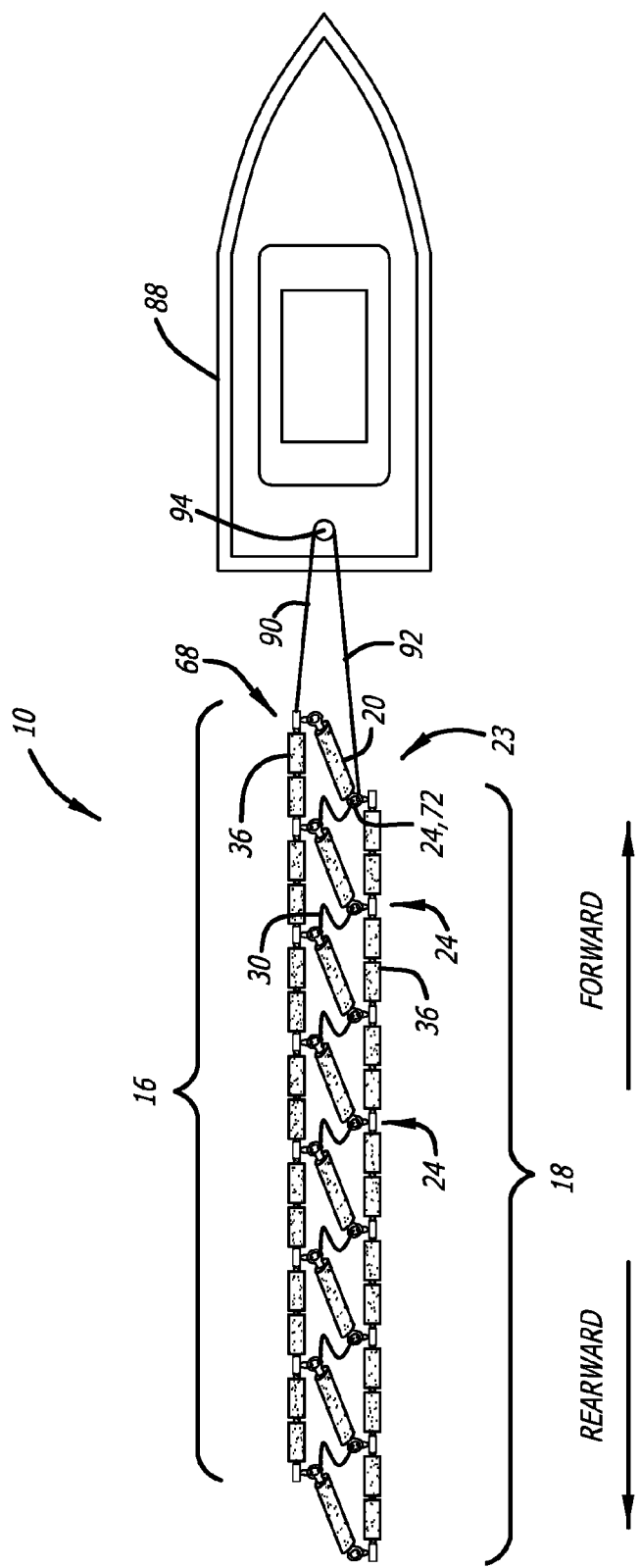
FIG. 6 is a plan view of an elongated version of the standoff system of FIG. 2 in a collapsed configuration and being towed by a boat via a double tow-line arrangement.

FIG. 6 shows an elongated version of the standoff system 10 of FIG. 2 in a collapsed configuration and being towed by a boat 88 into position around a ship or other structure. In this particular embodiment, an inner tow line 90 is attached to the front end 68 of the inner side member 16 and an outer tow line 92 is attached to the front end 72 of the outer side member 18. The tow lines 90, 92 may be integral parts of the side members 16, 18, if desired. For example, the tow lines 90, 92 may be extensions of the ropes or cables used in the side members 16, 18. In the embodiment shown, the inner and outer tow lines 90, 92 are attached to a single tow-point 94 on the boat 88, so that the compression members 20 are being pulled along by both the inner and outer side members 16, 18. However, the outer tow line 92 is longer than the inner tow line 90, which allows the standoff system 10 to automatically assume a collapsed configuration as it is being pulled by the boat 88. In this configuration, drag from the water causes the inner side member 16 to be placed in tension, and causes the outward ends 24 of the compression members 20 to move rearwardly and toward the inner side member 16 into a collapsed configuration. It will be appreciated that the standoff system 10 presents less drag in the water while in a collapsed configuration, as compared to a deployed configuration.

With further reference to FIG. 6, it will be seen that the tension lines 30 optionally remain attached to the compression members 20 while the standoff system 10 is being towed by the boat 88. However, if desired, the tension members 30 can be removed from the compression members 20 during the towing operation. With the tension members removed, the standoff system 10 can be towed by either the inner tow line 90 or the outer tow line 92, as desired, and assume a collapsed configuration.

Figure 7:
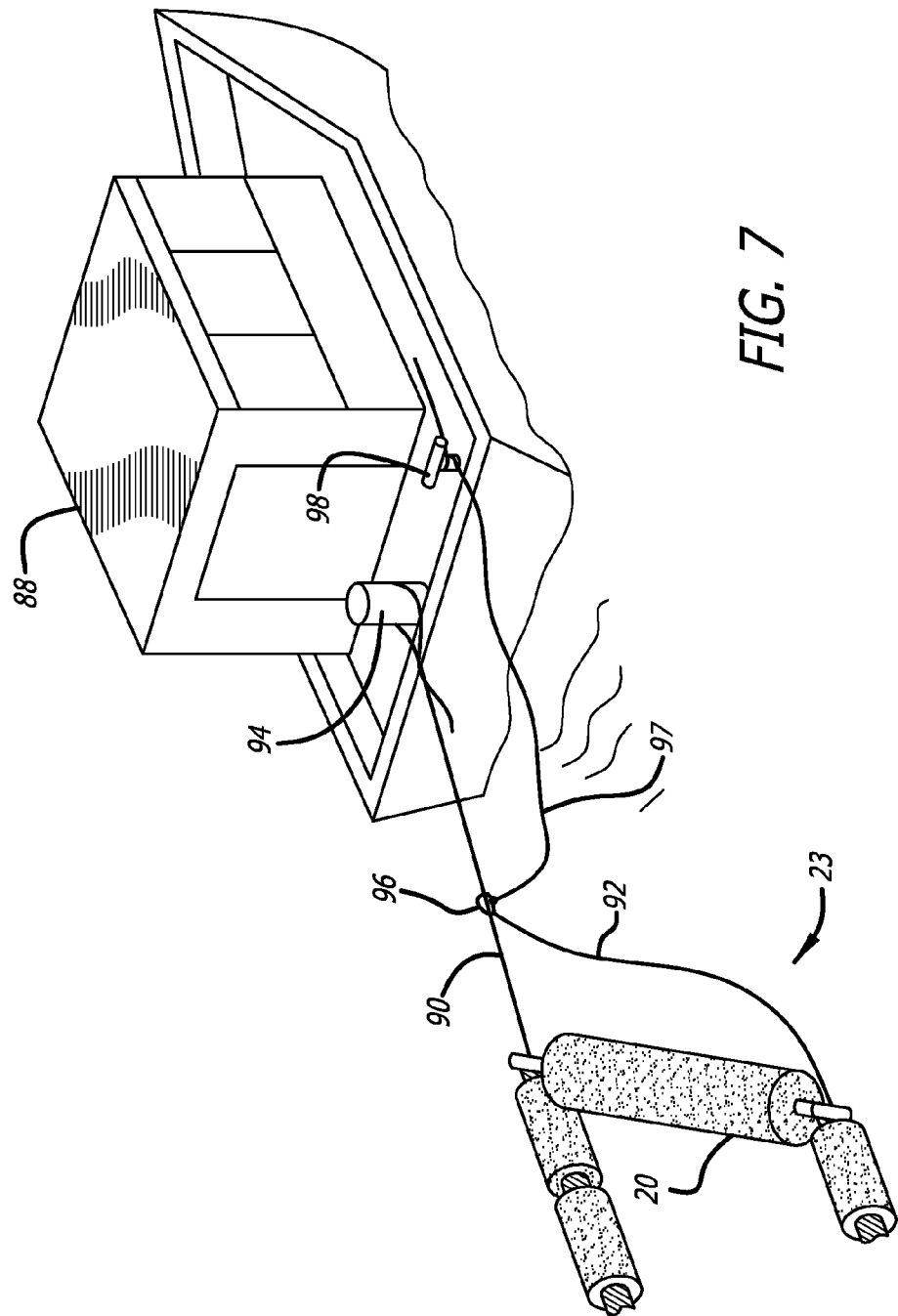
FIG. 7 is an enlarged fragmentary perspective view of the standoff system of FIG. 6 in a collapsed configuration and being towed by a boat via a single tow-line arrangement.

FIG. 7 shows an alternative towing arrangement for the standoff system 10, in which the inner tow line 90 is looped around the tow-point point 94 on the boat 88, while the outer tow line 92 terminates in a ring or loop 96 which loosely engages the inner tow line 90. In this way, the outer tow line 92 is not required to be longer than the inner tow line 90. Instead, the end of the outer tow line 92 slides freely along the inner tow line 90, allowing the standoff system 10 to collapse automatically while being towed by the boat 88. The loop 96 also prevents the outer tow line 91 from drifting away from the inner tow line 90, where it could become snagged on a buoy, floating debris or some other structure. In this particular embodiment, an optional retrieval line 97 is attached to the outer tow line 92 and to a cleat 98 on the back of the boat 88. By pulling the retrieval line 97 toward the boat 88 after the standoff system 10 has been towed into place, a user on the boat 88 can easily retrieve the tow line 92 from the water. The retrieval line 97 can be connected to the loop 96 or to other locations along the tow line 92.

Figure 8:
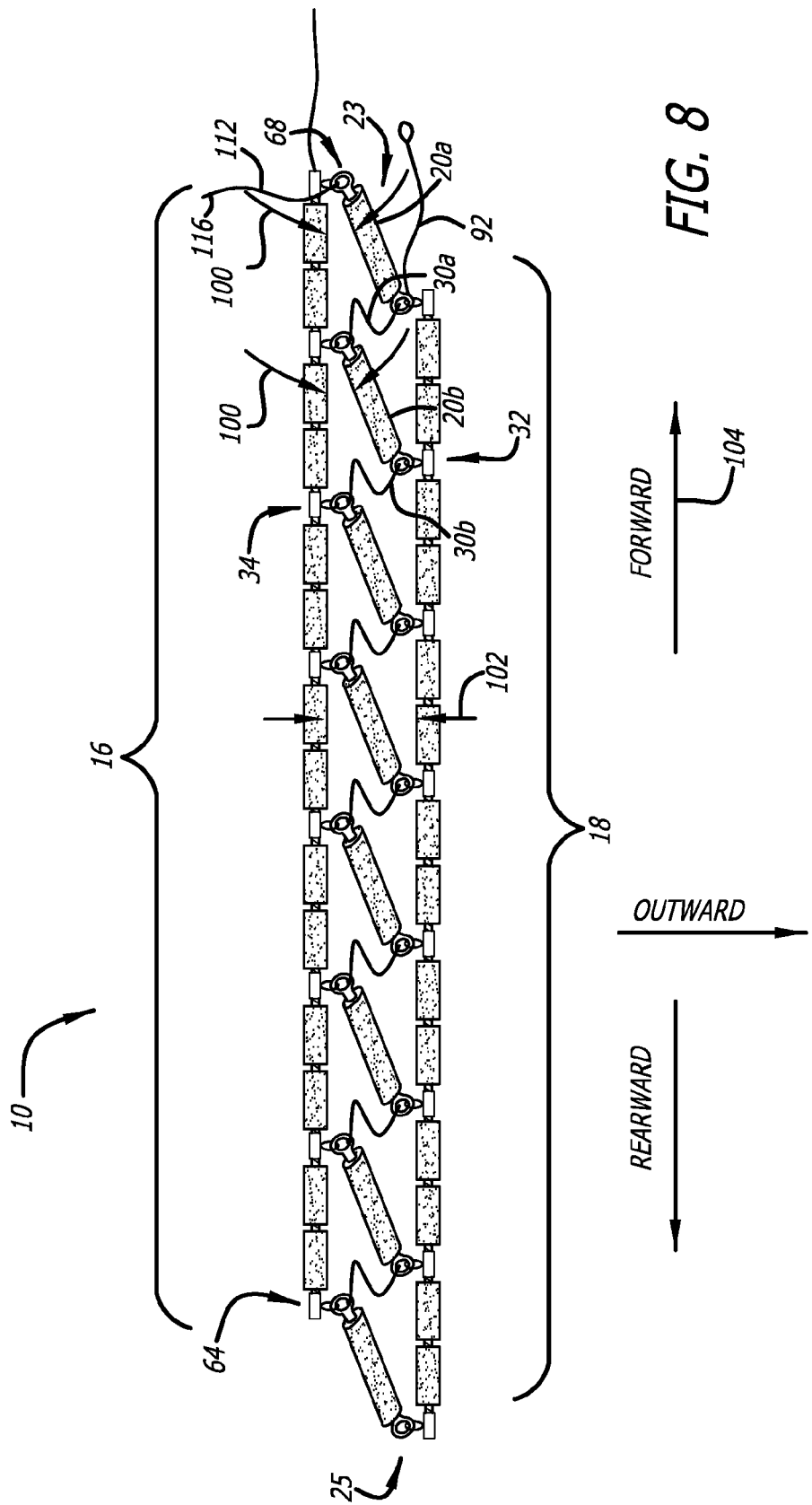
FIG. 8 is a plan view of a standoff system embodying the features of the present invention in a collapsed configuration.

Referring now to FIG. 8, a standoff system 10 with eight compression members 20 is shown in the collapsed state. In the collapsed configuration, the compression members 20 are oriented at an acute angle 100 relative to the inner side member 16, and the outer side member 18 is disposed at a minimum distance 102 from the inner side member 16. In this collapsed condition, the minimum distance is less than the desired standoff distance 87 (FIG. 5). However, by pulling on the outer tow line 92 in a generally forward direction, as shown by arrow 104, the outer side member 18 will translate longitudinally relative to the inner side member 16 and will progressively move the compression members 80 from the collapsed orientation shown in FIG. 8 to a deployed orientation as shown in FIG. 9, increasing the spacing between the side members 16, 18 until the desired standoff distance is achieved.

In the collapsed condition, the tension members 30 that remain attached to the compression members 20 will flex or dangle loosely from their respective connections 32, 34, as shown in FIG. 8. However, during deployment, as the compression members 20 move toward the deployed orientation, the tension lines 30 begin to straighten out, as shown in FIG. 9. Preferably, the tension members 30 are sized in relation to the length of the compression members 20 and the distance between the compression members to allow the outward ends 24 of each compression member 20 to move forwardly and outwardly away from the inner side member 16 as the outer side member 18 is being pulled in the forward direction 104, but to limit further forward movement once the compression members 20 have reached their fully deployed state.

Figure 8A:
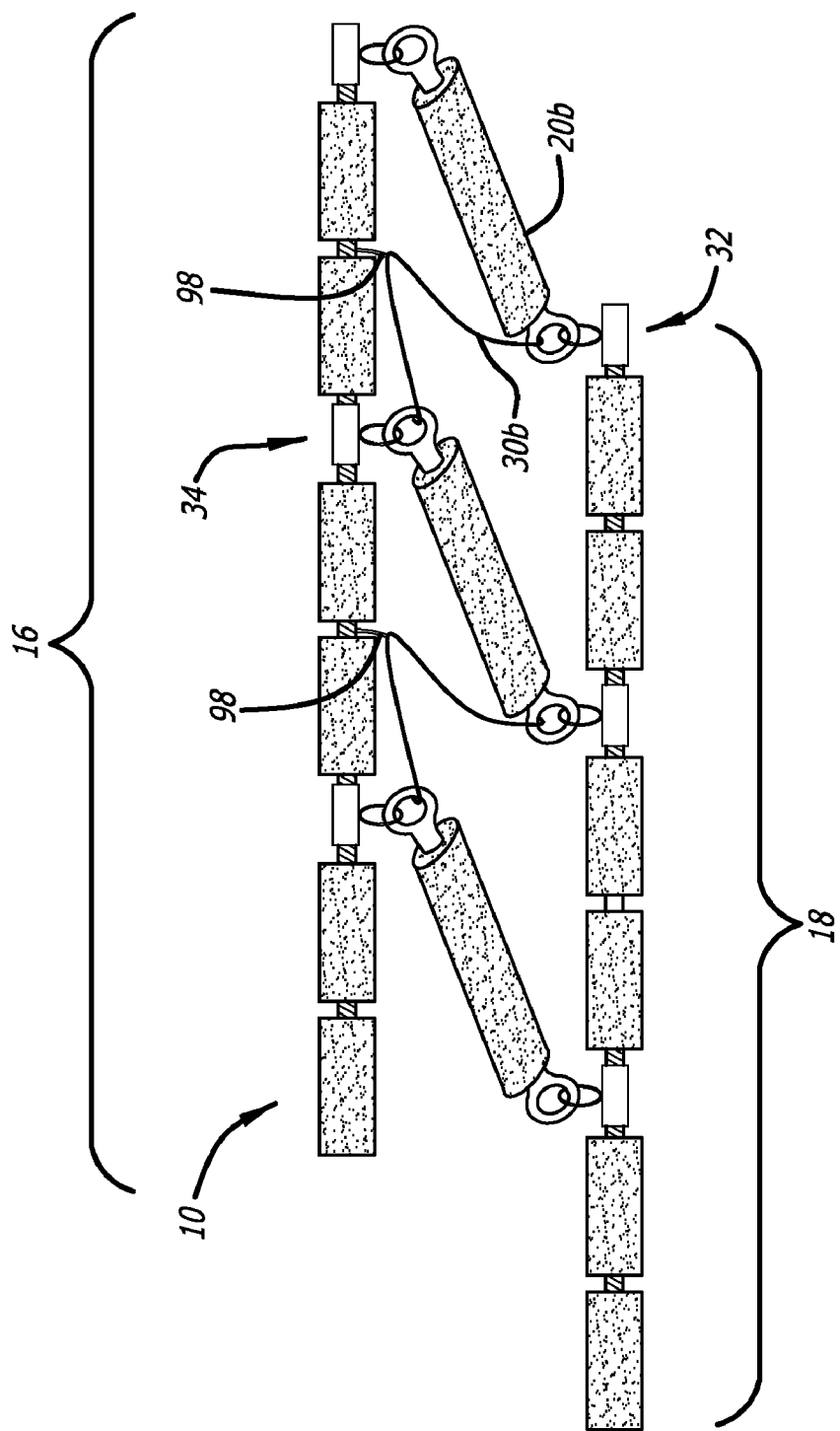
FIG. 8A is an enlarged, fragmentary plan view of an alternative embodiment of the standoff system of FIG. 8, including an elastic cord to take up slack in the tension members when the standoff is in the collapsed configuration.

FIG. 8A shows an optional arrangement in which an elastic cord 98 is provided to take up the slack in the tension member 30 when the standoff system 10 is in the collapsed configuration. The ends of the cord 98 are connected to the tension member 30 and to one of the side members 16, respectively. When stretched, the cord 98 spans the entire distance between the side member 18, 18 and the tension member 30. However, when relaxed, the cord 98 is relatively short in relation to size of the opening between the compression members 20. As a result, as the standoff assumes the collapsed configuration, the elastic cord will contract and pull the tension member 98 toward the side member 16 taking up the slack in the tension member 30. The elastic cord can be formed of bungee cord or any other elastic material. While only a single cord 98 is shown in FIG. 8A, it will be appreciated that similar cords can be attached to each of the tension members 30 in the standoff system. Taking up the slack in the tension members 30 avoids having the tension member 30 dangle loosely or sink down below the water surface where they can become snagged on underwater structures or floating debris.

FIG. 9 shows the standoff system 10 of FIG. 8 in a fully deployed state. In this particular configuration, the compression members 20 are deployed at generally right angles 110 to the side members 16, 18, and the distance 102 between the inner and outer side members 16, 18 is generally equal to or greater than the minimum required standoff distance.

Without at least one of the tension members 30, it will be appreciated that the outward ends 24 of the compression members 20 would continue to move forward as the outer side member 18 is being pulled in the forward direction 104, such that the compression members would move beyond their desired deployed orientation. The tension members 30 are used to prevent this from occurring. By using the tension members 30 in this way, it is possible to keep both sides 16, 18 of the standoff 10 in tension after deployment in order to maintain the proper deployment configuration and the proper positioning of the standoff relative to the adjacent structure.

If desired, the standoff system 10 can be provided with second tension members 112, between the compression members 20. The second tension member 112 is designed to prevent rearward movement of the compression members 20 once deployment is complete. In the example shown in FIG. 9, the first tension member 30*a* has a front connection 32 attached to the outward end 24 of the first compression member 20*a* and a rear connection 34 attached to the inward end 22 of the second compression member 20*b*, which is located to the rear of the first compression member 20*a*. Conversely, the second tension member 112 has a front or first connection 114 attached to the inward end 22 of the first compression member 20*a* and a rear or second connection 116 attached to the outward end 24 of the second compression member 20*b*. The result is two tension members 30*a*, 112 that crisscross with each other in the region between the compression members 20*a*, 20*b*. The length of the second tension member 112 is selected so that the outward ends 24 of the compression members 20 are restrained from rearward movement when the standoff is in the fully deployed state. Thus, it will be appreciated that while the first tension member 30*a* limits forward movement of the compression member 20*a*, the second tension member 112 restrains movement of the compression member 20*b* in a rearward direction 105. As a result, when rigid sleeves 36 are used along at least one of the side members 16, 18, the compression members 20*a*, 20*b* will remain locked in their deployed state even if tension is released in the side members 16, 18. With a standoff system 10 of the type shown in FIG. 1, where the side members 16, 18 are configured without the sleeves 36, it is preferable to keep the side members 16, 18 in tension in order to maintain the proper configuration when deployed.

Although only one second tension member 112 is shown in FIG. 9, additional tension members 112 may be installed between pairs of compression members 20, as desired, to increase the overall stability and strength of the standoff system 10. Likewise, it is not necessary that the second members 112 be installed between the same pair of compression members 20 linked by the first tension member 30, as shown in FIG. 9. Instead, the second tension member 112 may be installed between a different pair of compression members 20. Second tension members 112 also may be used with any of the standoff systems described herein.

When the standoff system 10 is in the collapsed condition as shown in FIG. 8, either one or both of the connections for the second tension member 112 are detached from the compression members. For example, as can be seen in FIG. 8, the rearward end 116 of the second tension member 112 has been disconnected from the second compression member 20*b*. However, once the compression members 20 have been moved from the collapsed configuration to the deployed configuration, both connections 114, 116 for the second tension member 112 may be optionally attached, as described above, in order to retain the standoff in the fully deployed state.

It will be appreciated that the second tension member 112 is completely optional. When no second tension member 112 is used, the compression members 20 may be retained in the deployed configuration by tensioning and securing the outer tow line 92 to a fixed structure to restrain the outer side member 20 from being pulled rearward. If desired, the secured tow line 92 may function alone or in combination with one or more tension members 112 as a locking mechanism to hold the compression members 20 in the deployed orientation.

Once the standoff system 10 is deployed, additional compression members 20 may be selectively added to the standoff at intermediate positions between the existing compression members. These additional compression members 20 add stiffness and increase the strength of the standoff.

Figure 10:
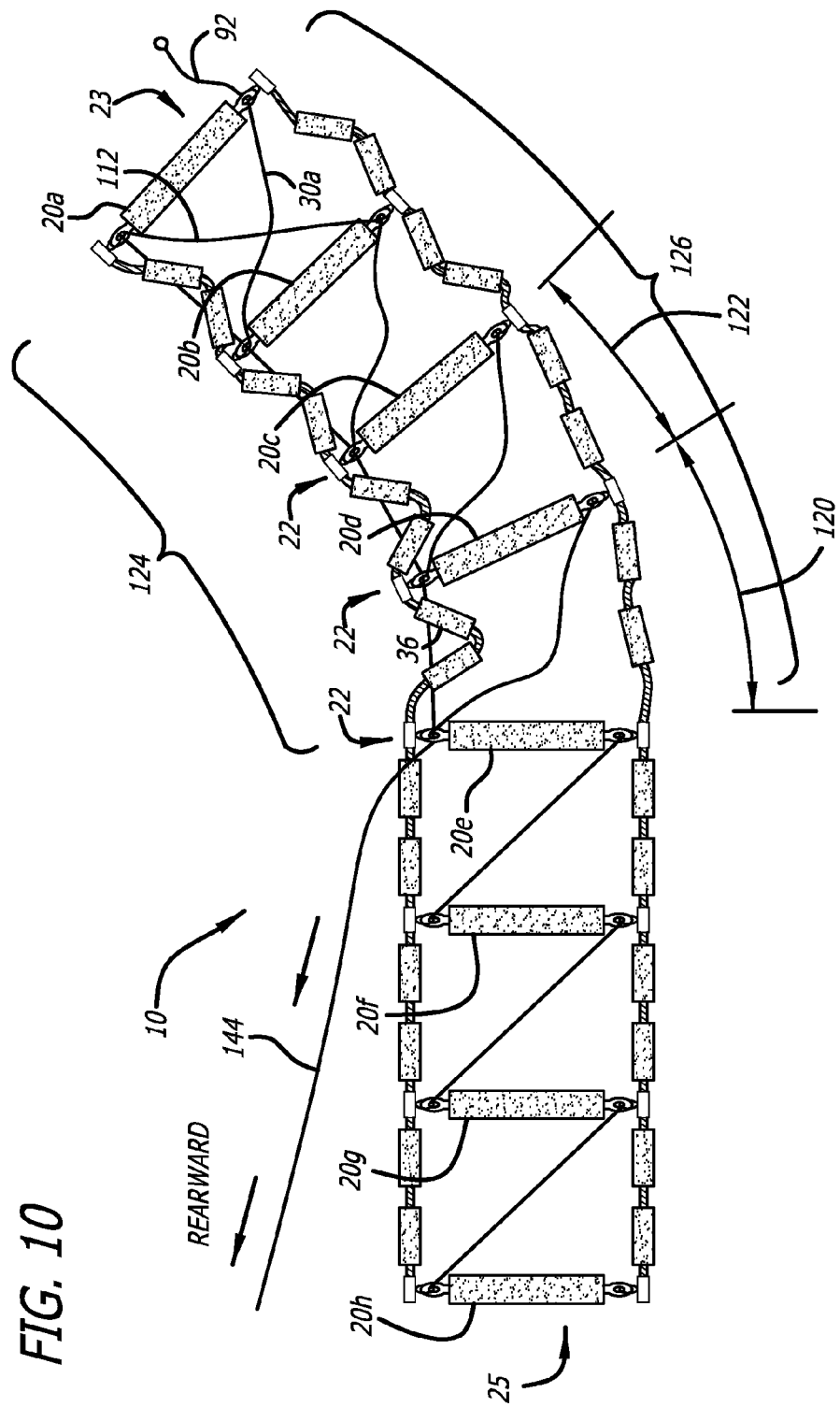
FIG. 10 is a plan view of the standoff system of FIG. 9 showing the system partially set up to go around a corner.
Figure 11:
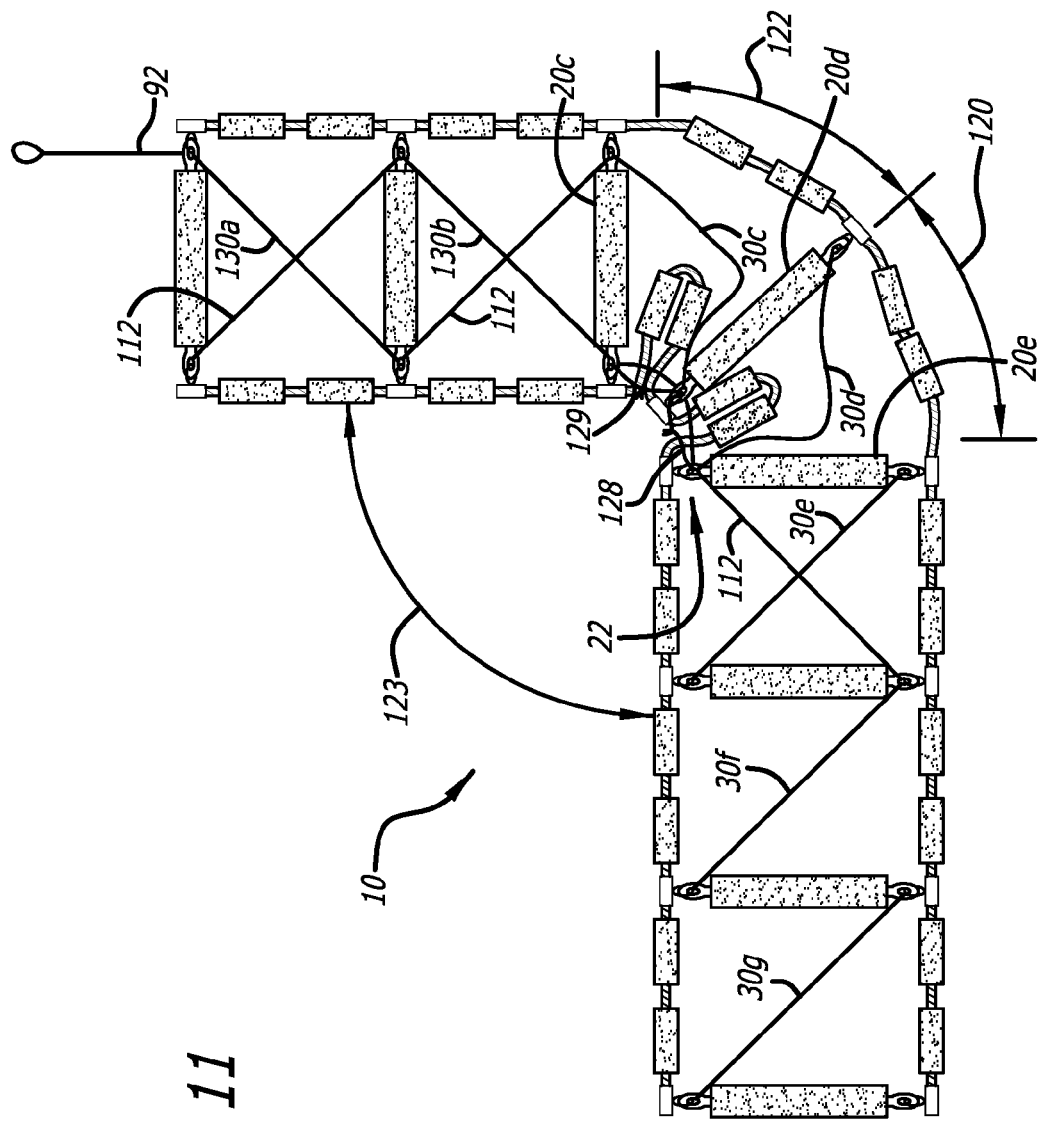
FIG. 11 is a plan view of the standoff system of FIG. 9 showing the system set up to go around a ninety-degree corner.

As shown in FIG. 9, when fully deployed, the compression members 20*a*-20*h* are generally parallel and spaced apart from each other, and the standoff system 10 as a whole follows a generally straight path. However, in some circumstances, it may be desirable to have the standoff system 10 go around a corner of a structure, such as the corner 114 of a ship 84, as shown in FIG. 5, or when the standoff 10 is to be used with a barge having a more rectangular shape. FIGS. 10 and 11 show one way of how the standoff system 10 of FIG. 9 may be moved to a cornering configuration so as to pass around a ninety-degree corner.

As shown in FIG. 10, a forward portion 124 of the inner side member 16 and a forward portion 126 of the outer side member 18 are placed out of tension. The inward ends 22 of the compression members 20*c*, 20*d*, and 20*e* in the forward portion 124 are then moved toward each other so that the compression members 20*c*, 20*d*, 20*e* are at angles 120, 122 relative to one another. Simultaneously, the sleeves 36 between the compression members 20*c*, 20*d* and 20*e* on the inner side member 16 are folded into the spaces between the compression members 20*d*, 20*e*. The angles 120, 122 between the compression members 20*c*, 20*d*, 20*e* are selected so that the standoff system 10 can turn a corner at a desired radius of curvature. When the compression members 20*c*, 20*d*, and 20*e* are at the desired angles, the inward ends 22 of the compression members 20*c*, 20*d*, and 20*e* may be connected together with various connection devices to prevent the inward ends 22 of the compression members 20*c*, 20*d*, and 20*e* from moving apart from each other. Examples of suitable connection devices include, without limitation, ropes, cables, clips, clasps, clamps, hooks, and similar devices.

FIG. 11 shows the standoff system 10 disposed in a ninety degree angle cornering configuration. In this example, the inward end 22 of compression member 20*e* is connected to the inward end 22 of the adjacent compression member 20*d* with a first connection device 128. The compression members 20*e*, 20*d* are connected together such that the angle 120 between them is about forty-five degrees. Likewise, the inward end 22 of the second compression member 20*d* is connected to the inward end 22 of the next adjacent compression member 20*c* with the first connection device 128 or with a second connection device 129. These compression members 20*d*, 20*c* are also connected together such that the angle 122 between them is about forty-five degrees. The overall result is that the compression members 20c and 20e at the ends of the cornering configuration are disposed at about ninety-degrees relative to each other, allowing the standoff system 10 as a whole to have a ninety-degree cornering angle 123. In the particular embodiment shown in FIG. 11, the connection devices 128, 129 are formed of rope extending through the rings 50 at the inward ends 22 of the compression members 20. Crisscross tension members 112. 130 also have been installed between the compression members 20 near the corner region to help maintain the overall shape of the standoff system 10.

Figure 12:
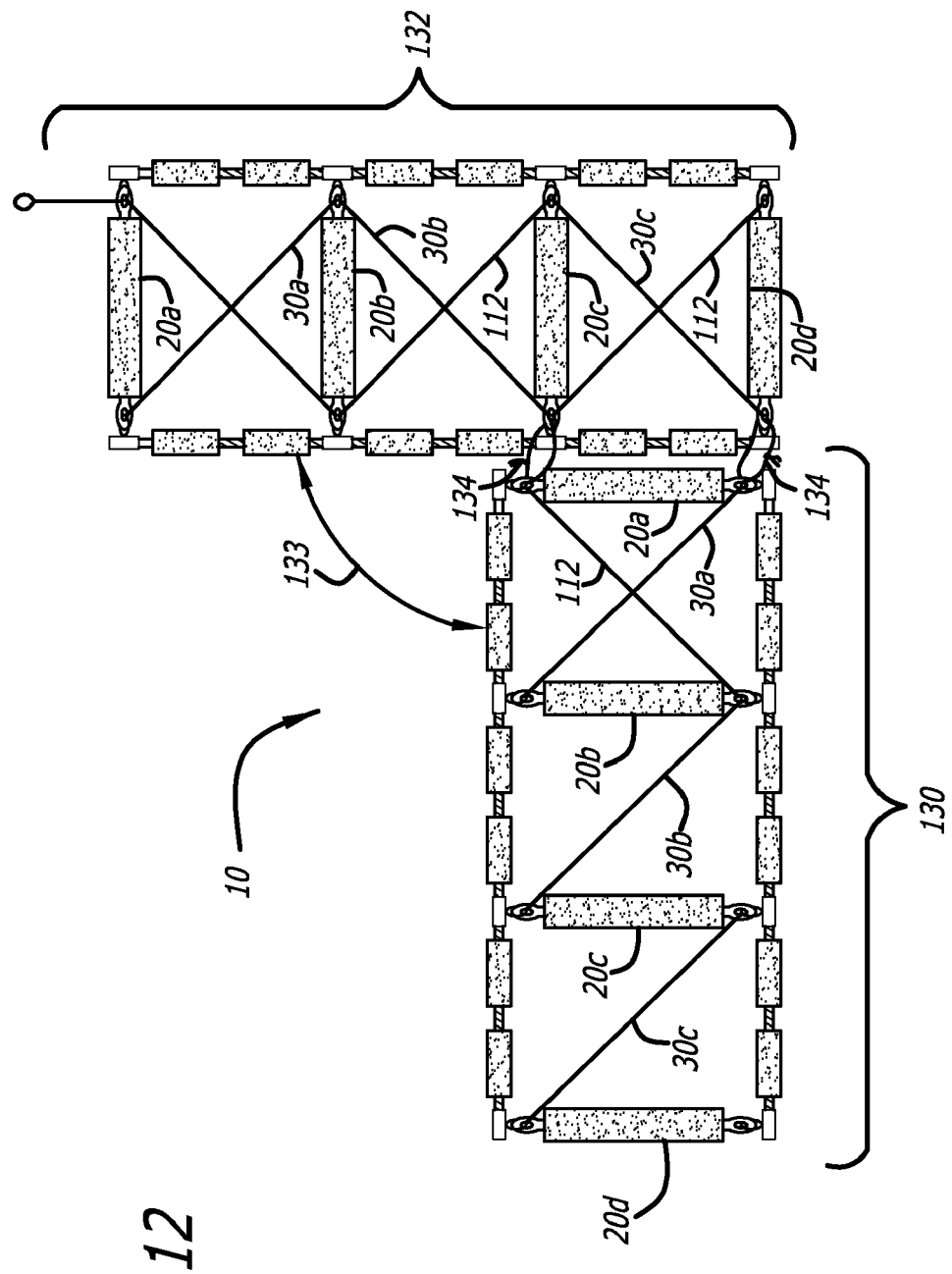
FIG. 12 is a plan view of an alternative cornering arrangement in which two standoff systems of the type shown in FIG. 2 are arranged at right angles to each other to go around a ninety-degree corner.

FIG. 12 shows an alternative method of cornering using two separate standoff systems of the type shown in FIG. 2, arranged at an angle to each other. In use, a first standoff system 130 is deployed, and then a second standoff system 132 is deployed at the selected angle 133 to the first standoff system 130. In the particular embodiment shown in FIG. 12, the first and second standoff systems 130, 132 are arranged to form a ninety-degree angle. Of course, other angles may be selected as desired. Connection devices 134 may be used to connect the two standoff systems 130, 132 together in order to maintain the desired cornering angle and to help strengthen the standoff systems 130, 132 in the cornering area.

Figure 13:
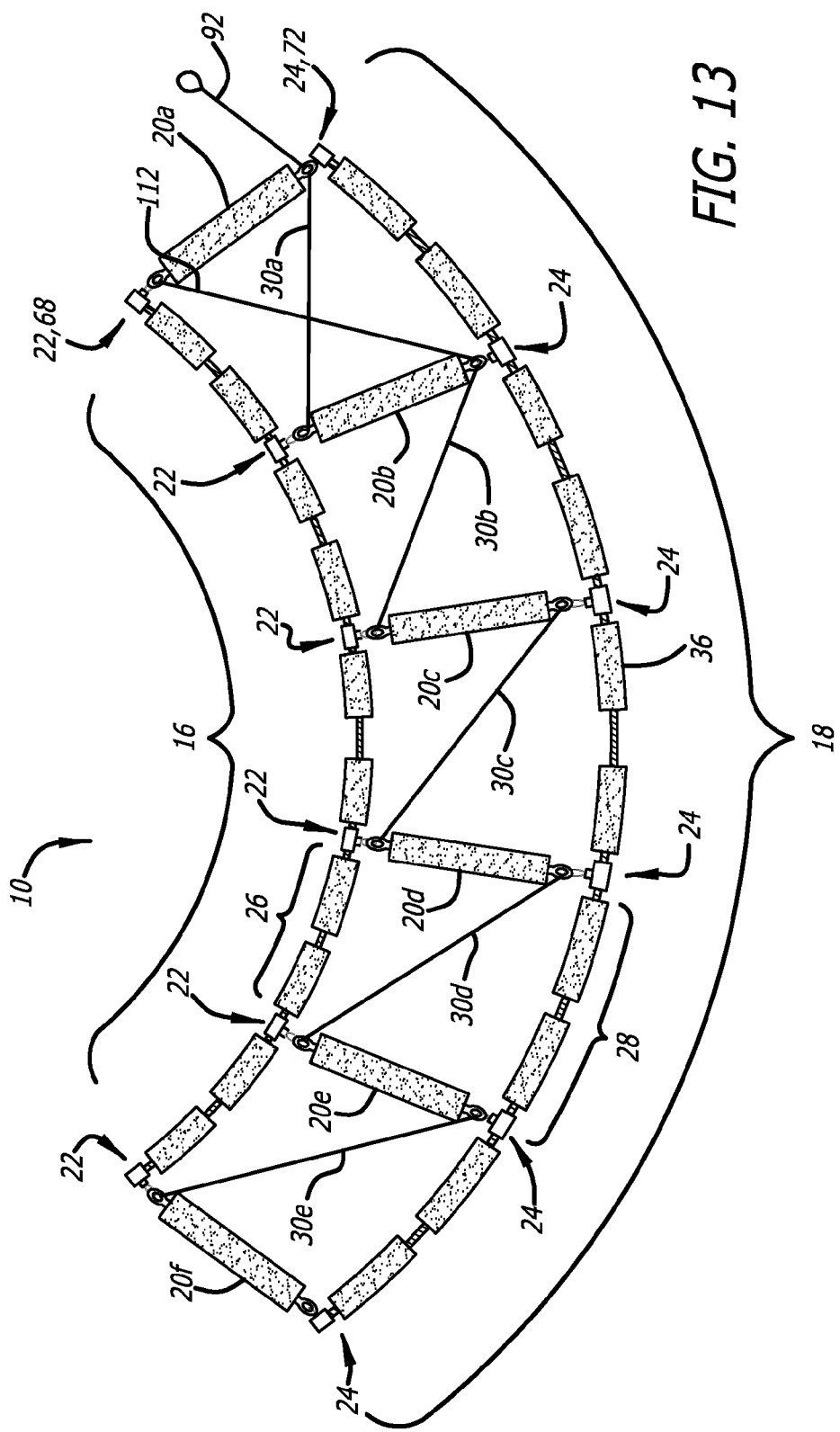
FIG. 13 is a plan view of an alternative standoff system embodying features of the present invention, configured for deployment along a curved structure.

In some applications, it also may be desirable to have a standoff system 10 which is capable of following a curved structure, such as a curved portion 136 of a ship 84, as shown in FIG. 5. FIG. 13 shows a standoff system 10 that is capable of assuming a curved or arcuate shape. In this embodiment, the outer side member 18 is longer than the inner side member 16. The inward ends 22 of the compression members 20 are spaced a first distance 26 apart from each other when the inner side member 16 is placed in tension, and the outward ends 24 of the compression members 20 are spaced a second distance 28 apart from each when the outer side member 18 is placed in tension. In the embodiment shown in FIG. 13, the second distance 28 is greater than the first distance 26. As a result, the side members 16, 18 assume a curved or arcuate shape when both members 16, 18 are placed in tension. In this particular case, the inner side member 16 defines a first radius of curvature, while the outer side member 18 defines a second, larger radius of curvature, allowing the standoff to conform to a structure having convex surfaces.

It will be appreciated that the first distance 26 can be made greater than the second distance 28, if desired, to provide a standoff system 10 that curves in the opposite direction and conforms to a structure having concave surfaces. It also will be appreciated that different degrees of curvature may be obtained by the varying the differences between the first and second distances 26, 28. In yet other embodiment, the first and second distances 26, 28 between some pairs of compression members 20 are different, while the first and second distances between other pairs of compression members are substantially the same. In this way, one continuous standoff system 10 may be used along a structure having both straight portions and curved portions.

FIG. 14 shows an alternative embodiment of the standoff system 10. This embodiment is generally similar to the embodiment shown in FIG. 1. It includes an inner side member 16, an outer side member 18, and a plurality of compression members 20 extending between the side members 16, 18. However, unlike the embodiment shown in FIG. 1, which is collapsed by moving the side member 16, 18 longitudinally relative to each other, the embodiment shown in FIG. 14 is collapsed by progressively moving the compression members at the rearward end of the standoff 10 toward the forward end of the standoff 10 into an abutting relationship as shown in FIG. 14. The resulting reduction in length of the standoff 10 makes it easier to store, maneuver and re-deploy than a standoff in a fully deployed state. This particular method of longitudinal collapsing is especially useful for moving the standoff 10 short distances after it has been deployed.

The longitudinal collapsing of the standoff 10 can be facilitated by providing a pair of pull lines 142, one on each side of the standoff 10. Each pull line 142 is connected to the rearward-most compression member 20 and passes sequentially through the rings 50 on the ends of the remaining compression members 20. By pulling these lines 142 in the forward direction, the rearward compression members 20 are progressively moved forward into the longitudinally collapsed state as shown. It will be appreciated that the collapsing arrangement can be reversed if desired, by connecting the pull lines 142 to the forward-most compression members 20 instead of the rearward-most compression member 20 and then pulling the lines 142 in a rearward direction so as to move the forward compression members 20 rearwardly into a longitudinally collapsed state.

A similar type of pull line 144 also can be used to assist in moving the standoff into a cornering configuration. In the example shown in FIG. 10, the pull line 144 is connected to an end of the forward-most compression member 20a, and passes sequentially through the rings on the ends of the adjacent compression members 20b, 20c, 20d, until it exits through the ring on the end of the compression member 20e at the location where the cornering configuration begins. By pulling this line 144 in the rearward direction after tension has been released in the side members, the forward portion 124 of the inner side member 16 can be moved from the straight configuration to the cornering configuration.

While several particular forms of the invention have been illustrated and described, it will be apparent that various modifications can be made without departing from the spirit and scope of the invention. It is also contemplated that various combinations or subcombinations of the specific features and aspects of the disclosed embodiments can be combined with or substituted for one another in order to form varying modes of the invention. Accordingly, it is not intended that the invention be limited, except as by the appended claims.

What is claimed is:

1. A floating standoff system to be deployed on the surface of a body of water for providing a desired minimum standoff distance between a floating device and an adjacent structure, the system comprising:
   an inner side member;
   an outer side member;
   the inner and outer side members being flexible in regions, the standoff distance being dependent upon the distance between the side members;
   a plurality of compression members disposed between the side members, each compression member having an inward end flexibly connected to the inner side member and an outward end flexibly connected to the outer side member, the inward ends being spaced a first distance apart from each other and the outward ends being spaced a second distance apart from each other;
   the compression members having a first, collapsed orientation in which the compression members are disposed at first angles relative to the side members such that the distance between the side members is less than the desired standoff distance; and
   the compression members having a second, deployed orientation in which the compression members are disposed at second angles relative to the side members, the second angles being greater than the first angles such that the distance between the inner side member and the outer side member is substantially equal to or greater than the desired standoff distance.

2. The standoff system of claim 1, wherein the outer side member is moveable longitudinally relative to the inner side member, such that when the outer side member is moved in a forward direction, the outward ends of the compression members are moved in the forward direction and the compression members are moved from the collapsed orientation to the deployed orientation.

3. The standoff system of claim 1, further comprising a limiting member that restrains the compression members from moving beyond the deployed orientation upon the application of a longitudinal force to the outer side member, the limiting member being connected to at least one compression member and being configured to restrain forward movement of the outward end of the compression member when the outer side member is moved in a forward direction.

4. The standoff system of claim 1, wherein the first distance between the inward ends of the compression members is substantially equal to the second distance between the outward ends of the compression members and the side members are substantially straight when the compression members are in the deployed orientation.

5. The standoff system of claim 1, wherein the first distance between the inward ends of the compression members differs from the second distance between the outward ends of the compression members and the side members are curved when the compression members are in the deployed orientation.

6. A standoff system for providing a desired minimum standoff distance between a floating device and an adjacent structure, the system comprising:
an inner side member;
an outer side member;
a plurality of compression members disposed between the side members, each compression member having an inward end attached to the inner side member and an outward end attached to the outer side member, the inward ends being spaced a first distance apart from each other and the outward ends being spaced a second distance apart from each other;
the compression members having a first, collapsed orientation in which the compression members are disposed at first angles relative to the side members such that the distance between the side members is less than the desired standoff distance;
the compression members having a second, deployed orientation in which the compression members are disposed at second angles relative to the side members, the second angles being greater than the first angles such that the distance between the inner side member and the outer side member is substantially equal to or greater than the desired standoff distance;
a limiting member that restrains the compression members from moving beyond the deployed orientation upon the application of a longitudinal force to the outer side member, the limiting member being connected to at least one compression member and being configured to restrain forward movement of the outward end of the compression member when the outer side member is moved in a forward direction; and
a locking member that restrains the compression members from moving out of the deployed orientation, the locking member being connected to at least one compression member and being configured to restrain rearward movement of the outward end of the compression member when the outer side member is moved in a rearward direction.

7. The standoff system of claim 1, wherein the inner side member and the outer side member are formed of material selected from the group of flexible tension members consisting of rope, webbing, cable and fabric.

8. The standoff system of claim 1, wherein at least one of the inner and outer side members is provided with a series of flotation sleeves disposed between the ends of the compression members.

9. The standoff system of claim 1, wherein at least one compression member has sufficient buoyancy to keep the compression member afloat on water.

10. The standoff system of claim 9, wherein the at least one compression member includes a rigid core surrounded by a sleeve of buoyant material.

11. A standoff system for providing a desired minimum standoff distance between a floating device and an adjacent structure, the system comprising:
an inner side member;
an outer side member;
a plurality of compression members disposed between the side members, each compression member having an inward end attached to the inner side member and an outward end attached to the outer side member, the inward ends being spaced a first distance apart from each other and the outward ends being spaced a second distance apart from each other;
the compression members having a first, collapsed orientation in which the compression members are disposed at first angles relative to the side members such that the distance between the side members is less than the desired standoff distance; and
the compression members having a second, deployed orientation in which the compression members are disposed at second angles relative to the side members, the second angles being greater than the first angles such that the distance between the inner side member and the outer side member is substantially equal to or greater than the desired standoff distance;
wherein at least one compression member has sufficient buoyancy to keep the compression member afloat on water, the at least one compression member including a tube with sealed ends.

12. The standoff system of claim 1, wherein the compression members are flexibly connected to the side members by flotation buoys, each flotation buoy having a connector disposed on a portion of the buoy for engaging the adjacent compression member and side member.

13. The standoff system of claim 1, wherein the inner and outer side members comprise multiple segments detachably connected in an end-to-end configuration.

14. A standoff system for providing a desired minimum standoff distance between a floating device and an adjacent structure, the system comprising:
an inner side member;
an outer side member;
a plurality of compression members disposed between the side members, each compression member having an inward end attached to the inner side member and an outward end attached to the outer side member, the inward ends being spaced a first distance apart from each other and the outward ends being spaced a second distance apart from each other;
the compression members having a first, collapsed orientation in which the compression members are disposed at first angles relative to the side members such that the distance between the side members is less than the desired standoff distance;

the compression members having a second, deployed orientation in which the compression members are disposed at second angles relative to the side members, the second angles being greater than the first angles such that the distance between the inner side member and the outer side member is substantially equal to or greater than the desired standoff distance;

a limiting member that restrains the compression members from moving beyond the deployed orientation upon the application of a longitudinal force to the outer side member, the limiting member being connected to at least one compression member and being configured to restrain forward movement of the outward end of the compression member when the outer side member is moved in a forward direction; and an elastic link connected to the limiting member and to at least one of the side members for taking up slack in the limiting member when the compression members are in the collapsed orientation.

15. The standoff system of claim 1, wherein:
the inner side member is flexible and is configured to be placed in tension;
the inward ends of the compression members being spaced a first distance apart from each other when the inner side member is placed in tension;
the outer side member is flexible and is configured to be placed in tension; and
the outward ends of the compression members being spaced a second distance apart from each other when the outer side member is placed in tension, the second distance being substantially equal to the first distance whereby the compression members are substantially parallel to each other when the inner side member and the outer side member are placed in tension.

16. The standoff system of claim 1, wherein:
the inner side member is flexible and is configured to be placed in tension;
the inward ends of the compression members being spaced a first distance apart from each other when the inner side member is placed in tension;
the outer side member is flexible and is configured to be placed in tension; and
the outward ends of the compression members being spaced a second distance apart from each other when the outer side member is placed in tension, the second distance being unequal to the first distance whereby the compression members are at angles to each other when the inner side member and the outer side member are placed in tension.

17. The standoff system of claim 1, wherein:
the compression members are selectively movable into a straight configuration in which the compression members are substantially parallel and spaced apart from each other, and into a cornering configuration in which at least two of the compression members are arranged at a selected angle to each other; and
a connection device is configured to connect the inward ends of the at least two compression members together such that the at least two compression members are restrained from moving out of the cornering configuration.

18. A standoff system for providing a desired minimum standoff distance between a structure and a floating device, the system comprising:

an inner side member having a rear end and a forward end;
an outer side member having a rear end and a forward end;
a plurality of compression members disposed between the inner side member and the outer side member, the compression members being spaced apart along the inner side member and the outer side member, each compression member having an inward end and an outward end, the inward ends of the plurality of compression members being attached to the inner side member and the outward ends of the plurality of compression members being attached to the outer side member such that the outward ends of the compression members are movable relative to the inner side member; and at least one tension member having a front connection and a rear connection spaced a first selected distance apart from the front connection, the front connection being attached to the outward end of a forward compression member, the rear connection being attached to the inward end of a rearward compression member, the forward compression member being disposed closer to the forward end of the inner side member than the rearward compression member, wherein the first selected distance between the front connection and the rear connection of the tension member is selected to restrain forward movement of the outward end of the forward compression member when the distance between the inner side member and the outer side member is substantially equal to or greater than the desired standoff distance.

19. The standoff system of claim 18, further comprising a second tension member, the second tension member having a first connection and a second connection spaced a second selected distance apart from the first connection, the first connection being attached to the inward end of a forward compression member and the second connection being attached to the outward end of a rearward compression member;

the second selected distance between the first connection and second connection of the second tension member being selected to restrain rearward movement of the outer end of the forward compression member when the distance between the inner side member and the outer side member is substantially equal to or greater than the desired standoff distance.

20. A standoff system for providing a desired minimum standoff distance between a floating device and an adjacent structure, the system comprising:
an inner side member;
an outer side member;
a plurality of compression members disposed between the side members, each compression member having an inward end attached to the inner side member and an outward end attached to the outer side member, the inward ends being spaced a first distance apart from each other and the outward ends being spaced a second distance apart from each other;
the compression members having a first, collapsed orientation in which the compression members are disposed at first angles relative to the side members such that the distance between the side members is less than the desired standoff distance; and
the compression members having a second, deployed orientation in which the compression members are disposed at second angles relative to the side members, the second angles being greater than the first angles such that the distance between the inner side member and the outer side member is substantially equal to or greater than the desired standoff distance;

wherein the outer side member comprises an elongate flotation portion, the flotation portion supporting a skirt portion depending downwardly from the flotation portion, the flotation portion and the skirt portion providing a containment boom for deployment around a structure.

21. A standoff system for providing a desired minimum standoff distance between a floating device and an adjacent structure, the system comprising:
- a flexible inner side member;
- a flexible outer side member;
- a plurality of substantially parallel compression members disposed between the side members, each compression member having an inward end attached to the inner side member and an outward end attached to the outer side member, the inward ends being spaced a first distance apart from each other along the inner side member and the outward ends being spaced a second distance apart from each other along the outer side member;
- the compression members having a first, collapsed configuration in which adjacent compression members along the side members are disposed in a side-by-side abutting relation;
- the compression members having a second, deployed configuration in which inward ends of the compression members are spaced apart from each other by a distance substantially equal to the first distance and the outward ends of the compression members are spaced apart from each other by a distance substantially equal to the second distance.

22. The standoff system of claim 21, further comprising a pull line attached to at least one of the compression members for moving the compression member from the deployed configuration to the collapsed configuration upon the application of a pulling force to the pull line.

23. A standoff system for providing a desired minimum standoff distance between a floating device and an adjacent structure, the system comprising:
- an inner side member;
- an outer side member;
- a plurality of compression members disposed between the side members, each compression member having an inward end attached to the inner side member and an outward end attached to the outer side member, the inward ends being spaced a first distance apart from each other and the outward ends being spaced a second distance apart from each other;
- the compression members having a first, collapsed orientation in which the compression members are disposed at first angles relative to the side members such that the distance between the side members is less than the desired standoff distance; and
- the compression members having a second, deployed orientation in which the compression members are disposed at second angles relative to the side members, the second angles being greater than the first angles such that the distance between the inner side member and the outer side member is substantially equal to or greater than the desired standoff distance;
- wherein at least one of the inner and outer side members is provided with a series of flotation sleeves disposed between the ends of the compression members, and wherein only two flotation sleeves are disposed in an end-to-end arrangement between adjacent ends of the compression members.

24. The standoff system of claim 1, wherein the side members are configured to be placed in tension, and the compression members automatically assume the deployed orientation upon placing both side members in tension.

25. The standoff system of claim 24, further comprising one or more tow lines or attachments for applying tension to the inner and outer side members.

* * * * *